US007187925B2

(12) United States Patent
Abhishek et al.

(10) Patent No.: US 7,187,925 B2
(45) Date of Patent: Mar. 6, 2007

(54) ACCESS POINT TO ACCESS POINT RANGE EXTENSION

(75) Inventors: Abhishek Abhishek, Woodinville, WA (US); Arun Ayyagari, Seattle, WA (US); Hui Shen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 34 days.

(21) Appl. No.: 11/102,584

(22) Filed: Apr. 8, 2005

(65) Prior Publication Data

US 2005/0232211 A1    Oct. 20, 2005

Related U.S. Application Data

(62) Division of application No. 10/377,462, filed on Feb. 28, 2003.

(51) Int. Cl.
*H04Q 7/20* (2006.01)
(52) U.S. Cl. .................................... 455/426.1
(58) Field of Classification Search ................ 370/338; 455/422.1, 426.1
See application file for complete search history.

(56) References Cited

U.S. PATENT DOCUMENTS

2002/0159407 A1   10/2002  Carrafiello et al.

2003/0054818 A1    3/2003  Bahl et al.

FOREIGN PATENT DOCUMENTS

| EP | 1 134 935 A | 9/2001 |
| WO | WO 02/41587 A | 5/2002 |
| WO | WO 02/89339 A | 11/2002 |

*Primary Examiner*—William D. Cumming
(74) *Attorney, Agent, or Firm*—Wolf, Greenfield & Sacks, P.C.

(57) ABSTRACT

An architecture and methods for extending the depth of a WLAN to a four-level hierarchal access point structure including wireless access points. The wireless access points in the WLAN can be networked by scanning for a network, collecting one or more packets that identify the network from one or more access points, each packet including an address identifying an ancestry of the access points to an ancestral wired access point; and applying an access point selection algorithm to configure a parent access point. The architecture includes a scanning object configured to issue a scan request to a network interface and collect access point data; a selection object configured to filter and sort the collected access point data; an authentication state machine configured to perform authentication and validate; and an association state machine configured to compose a packet including hierarchical data indicative of access point ancestry to a conventional access point.

6 Claims, 32 Drawing Sheets

ACCESS POINT TO ACCESS POINT RANGE EXTENSION

RELATED APPLICATIONS

This application is a division of prior application Ser. No. 10/377,462, filed Feb. 28, 2003, entitled ACCESS POINT TO ACCESS POINT RANGE EXTENSION, which is incorporated herein by reference.

FIELD OF THE INVENTION

This invention relates generally to computer systems and, more particularly, relates to range extension for wireless computer systems.

BACKGROUND OF THE INVENTION

Wireless networks are becoming more and more popular. With the popularity of wireless networks increasing, users also demand broader coverage from a wireless network, such as voice, video and data communication support. One wireless local area network (WLAN) standard that has been gaining popularity is the IEEE 802.11 specification. The IEEE 802.11 specification provides requirements for devices to communicate wirelessly. In particular, the specification sets physical requirements, such as the communication method, and requirements for the media access control (MAC) layer of the WLAN.

The physical requirements for a IEEE 802.11 WLAN allow devices to communicate using modulation techniques such as direct sequence spread spectrum and frequency-hopping spread spectrum. The MAC layer is a set of protocols that is responsible for maintaining order in the use of a shared medium. The IEEE 802.11 standard specifies a carrier sense multiple access with collision avoidance (CSMA/CA) protocol.

An IEEE 802.11 infrastructure networking framework in which devices communicate with each other must first connect through an Access Point (AP). In general, there are two types of mode for connections with a WLAN, ad hoc mode and infrastructure mode. In infrastructure mode, wireless devices can communicate with each other or can communicate with a wired network via an AP. An AP connected to a wired network and a set of wireless stations it is referred to as a Basic Service Set (BSS). In ad hoc mode, also known as Independent Basic Service Set (IBSS), wireless devices communicate directly with each other without a central controller such as an AP. Additionally, in ad hoc mode, the wireless devices within the IBSS do not have access to other devices beyond the IBSS cell. Most corporate wireless LANs operate in infrastructure mode because they require access to the wired LAN in order to use services such as file servers or printers. In general, an AP must have a wired connection to provide access to the Internet or other networked resources. The requirement of a wired connection for an AP limits the depth available for a BSS because the BSS cell size is determined by the range of the radio transmitter/receiver pairs, which therefore limits the capabilities of a single AP. What is needed are systems and methods to increase the depth available to WLANs.

BRIEF SUMMARY OF THE INVENTION

Accordingly, an architecture and method for extending the depth of a wireless local area network (WLAN) extends the range of the WLAN by providing a four-level hierarchal access point structure including wireless access points coupled to a conventional wired access point. The wireless access points in the WLAN can be networked by scanning for a network, collecting one or more packets that identify the network from one or more access points, each of the one or more packets including an address identifying an ancestry of the access points to an ancestral wired access point; and applying an access point selection algorithm to configure a parent access point from the one or more access points, the chosen parent access point having an ancestry independent of the wireless access point.

The ancestry being independent of the wireless access point prevents a ring of access points. The scanning can include creating a list of candidate parent access points and selecting a best parent access point from the list according to the criteria such as signal strength, traffic load, position of the access point in a spinning tree, or by a random selection.

On embodiment is directed to a method for operating an access point in a wireless local area network (WLAN) that has a hierarchical structure. The method includes receiving one or more data packets, if the data packet is destined for a station in a local cell or a child access point (CAP) associated with the wired access point, the access point forwards the data packet. If the data packet is destined for a CAP or station outside the local cell, the access point determines the hierarchical location of the CAP or station within the LAN and alters the data packet according the location of the CAP or station in the hierarchical access point structure.

Another embodiment is directed to an architecture for a wireless access point in the hierarchical structure. The architecture includes a scanning object configured to issue a scan request to a network interface, the scanning object enabling collection of access point data; a selection object configured to filter and sort the collected access point data; an authentication state machine configured to perform authentication and validate a match between a parent access point and a wireless repeater access point; and an association state machine configured to compose a packet including hierarchical data indicative of access point ancestry to a conventional access point. The architecture further includes a plurality of application programming interfaces configured to operate the wireless access point.

The architecture can further include a router module configured to accept data packets with up to four access point addresses therein and to determine a next forward hop for data packets destined outside a local cell area of the wireless access point.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, can be best understood from the following detailed description taken in conjunction with the accompanying drawings of which:

FIG. 4 is a flow diagram illustrating a method for networking a wireless access point according to an embodiment of the present invention.

DETAILED DESCRIPTION OF THE INVENTION

Figure 1:
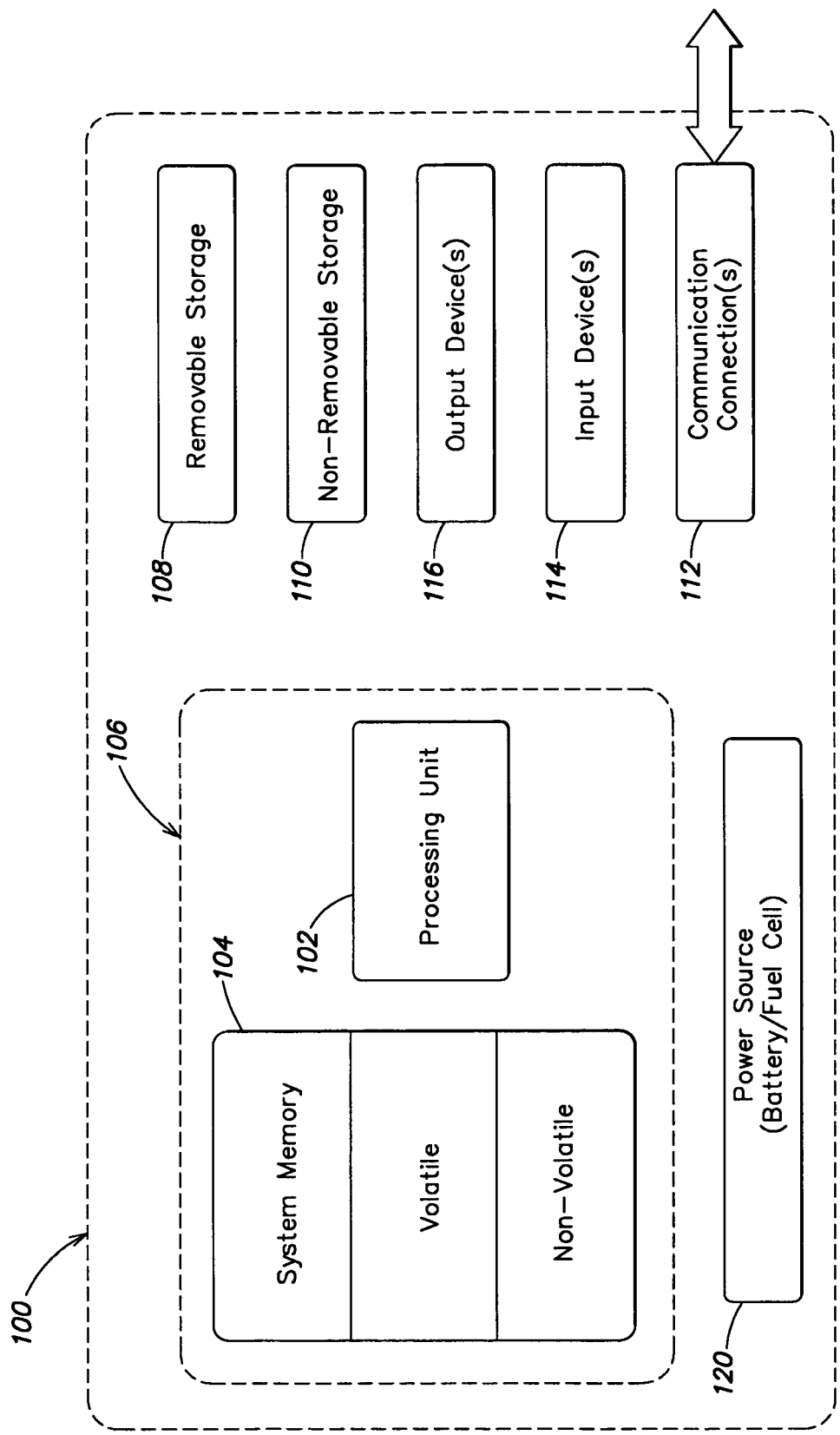
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

The invention may be implemented in a system employing various types of machines, including cell phones, handheld devices, wireless surveillance devices, microprocessor-based programmable consumer electronics, and the like, using instructions, such as program modules, that are executed by a processor. Generally, program modules include routines, objects, components, data structures and the like that perform particular tasks or implement particular abstract data types. The term "program" includes one or more program modules.

FIG. 1 shows an exemplary computing device 100 for implementing one or more embodiments of the invention. In its most basic configuration, the computing device 100 includes at least a processing unit 102 and a memory 104. Depending on the exact configuration and type of computing device, the memory 104 may be volatile (such as RAM), non-volatile (such as ROM, flash memory, etc.) or some combination of the two. The basic configuration is illustrated in FIG. 1 by a dashed line 106. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 108 and a non-removable storage 110. Computer storage media includes volatile and nonvolatile, removable and non-removable media implemented in any method or technology for storage of information such as computer readable instructions, data structures, program modules or other data. The memory 104, the removable storage 108 and the non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of the device 100.

Device 100 may also contain one or more communications connections 112 that allow the device to communicate with other devices. The communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

Device 100 may also have one or more input devices 114 such as keyboard, mouse, pen, voice input device, touch-input device, etc. One or more output devices 116 such as a display, speakers, printer, etc. may also be included. All these devices are well known in the art and need not be discussed at greater length here.

In keeping with the intended application of the invention, device 100 is configured as a wireless mobile device. To that end, device 100 is provided with a portable power source 120, such as a battery pack, a fuel cell, or the like. The power source 120 provides power for computations and wireless data transmissions by the device 100.

Figure 2:
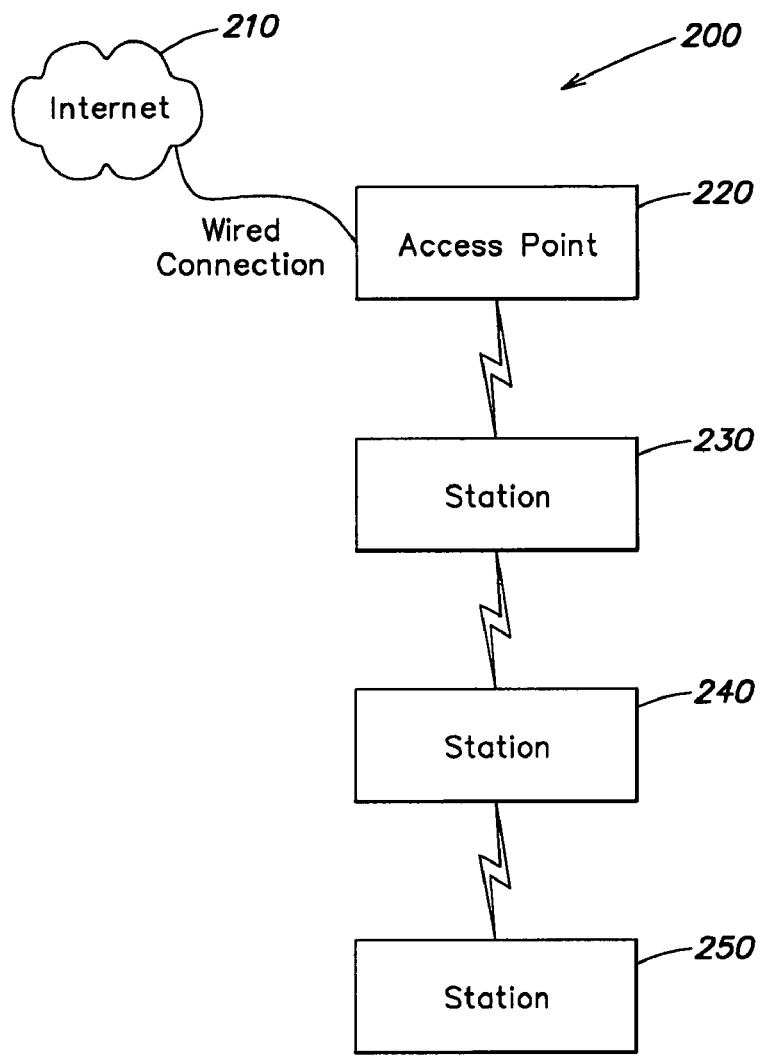
FIG. 2 is a block diagram of an IEEE 802.11 wireless system illustrating four layers of access points in accordance with an embodiment of the present invention.

Referring now to FIG. 2, an exemplary block diagram illustrates an embodiment directed to wireless system 200 that provides access point to access point range. Wireless system 200 is an IEEE 802.11 wireless infrastructure. As shown, the system includes Internet 210, with a wired connection to a conventional access point 220. Access point 220 interacts wirelessly with station 230 via an 802.11 frequency channel. According to an embodiment, station 230 behaves as a wireless station with access point 220 as its parent; and station 230 also behaves as a wireless access point. Station 230 acts as a parent to station 240. In an embodiment, station 240 is configured to communicate with station 230 on a same frequency channel. Station 240 is also configured to be an access point with respect to station 250.

Figure 3:
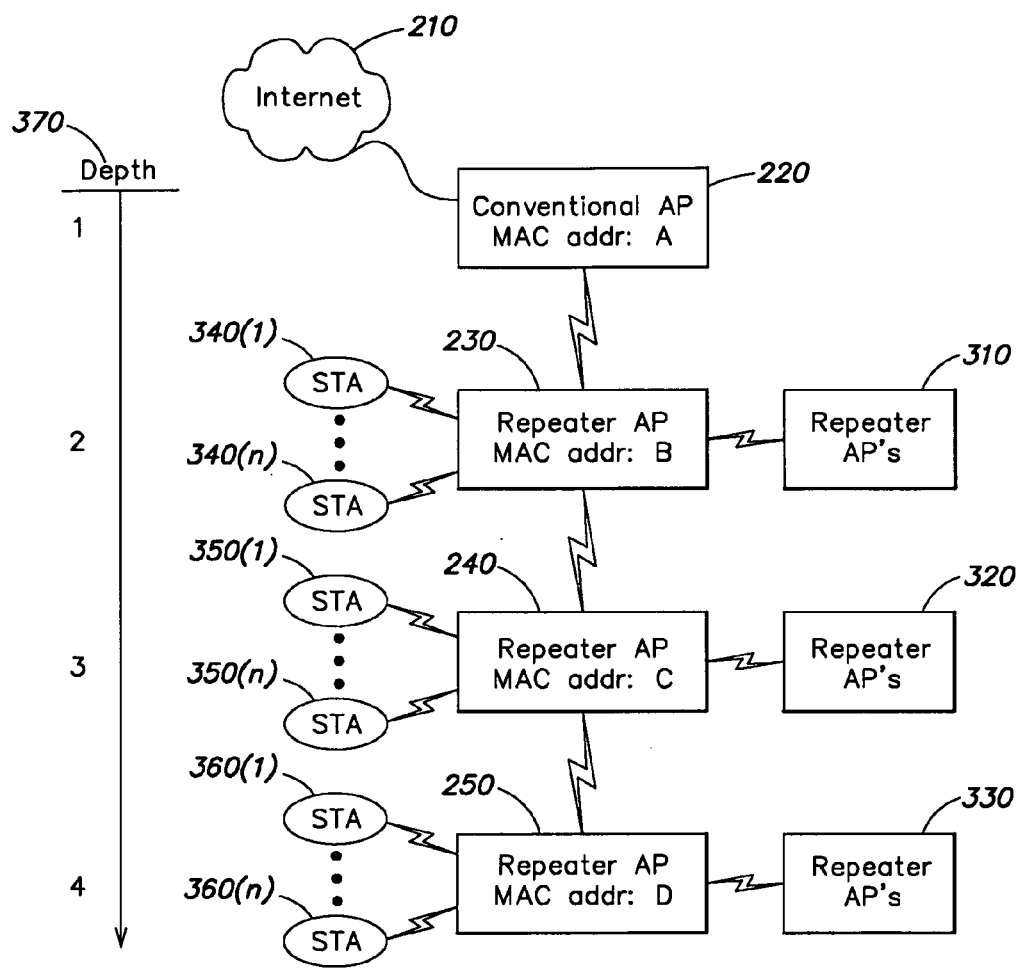
FIG. 3 is block diagram of an IEEE 802.11 wireless architecture in accordance with an embodiment of the present invention.

Referring now to FIG. 3, an architecture illustrating an embodiment showing how the system of FIG. 2 can be extended according to an embodiment of the present invention. As shown, FIG. 3 includes conventional access point 220, station 230, which is also a repeater access point with MAC address B, station 240, which is also a repeater access point with MAC address C, and station 250, which is also a repeater access point with MAC address D.

Conventional access point 220 can be wirelessly connected to other repeater access points/station combinations 310. Likewise, repeater access points 230 and 240 can be wirelessly connected to other access points 320 and respective stations 340(1-n) and 350(1-n). In an embodiment, however, repeater access point 250 is not configured to be wirelessly connected to further access points. However, repeater access point 250 can be wirelessly connected to stations 360(1-n).

Conventional access point 220, repeater access points 230, 240 and 250 and their respective stations 340, 350 and 360 are shown organized in four levels of depth 370, with conventional access point 220 at a first level, repeater 230 at a second level, repeater 240 at a third level and repeater 250 at a fourth level.

To implement the system with repeater access points, an embodiment directs that each access point transmit a beacon packet. The packet contains a Microsoft Information element packet, as shown below in Table 1. The table identifies an identification byte (MSFT IE ID), a length byte, an organizationally unique identifier (OUI), an OUI type, and content.

TABLE 1

| MSFT IE ID | IE length | OUI | OUI Type | Content |
|---|---|---|---|---|
| 1 byte | 1 byte | 3 bytes | 1 byte | 0~251 bytes |

In one embodiment, the MSFT IE ID is 0xdd (221); OUI value is 0x0050f2; OUI Type value is 3, and the content field is up to 251 bytes. Within the content field, an embodiment directs that the field include 0 or more Microsoft sub information elements. The Microsoft sub information elements are described below in Table 2.

TABLE 2

| OUI Subtype | Length | Version | Sub Information Element content |
|---|---|---|---|
| 1 byte | 1 byte | 1 byte | 0~248 bytes |

Microsoft Sub IE can be implemented using a type-length-value triple tuple structure, as is known in the art. The OUI subtype value can range from 1 to 255. In an embodiment, the OUI subtype value is understood by a proprietary IEEE 802.11 implementation, such as a Microsoft Native WiFi. The value 0 is reserved.

Length field can record the length of field of "Sub Information Element content". The value range is from 0 to 248. Version field is a mandatory field and can be configured to follow the length field for versioning purpose. The Information Element content field can be configured to hold information specific to a particular OUI subtype.

One of the Sub information elements, according to an embodiment, is implemented as a Parent Address List sub IE (PAL sub-IE). The PAL sub-IE can provide the media access control addresses for all parent AP's of a repeater AP, from the conventional wired AP to a particular repeater AP's direct parent.

Access points can be configured to advertise the PAL sub-IE in MSFT IE in the beacon or probe response to declare its position in the AP extension link. For example, referring to FIG. 3, AP 220, which is shown with MAC address "A" can have a PAL Sub-IE that does not include a MAC address because AP 220 is a conventional wired AP:

TABLE 3

| ID | len = 0 | Ver |
|---|---|---|

AP 230 with MAC address B identifies AP 220 as a parent AP and would include the parent AP 220 MAC address in the PAL Sub-IE:

TABLE 4

| ID | len: 6 | Ver | A |
|---|---|---|---|

AP 240 with MAC address C identifies AP 230 as a parent AP, and would include both parent AP 230 MAC address, and the grandparent AP 220 MAC address as follows:

TABLE 5

| ID | len: 12 | Ver | A | B |
|---|---|---|---|---|

AP 250 with MAC address D identifies AP 240 as a parent AP, and includes both the parent AP 240 MAC address, the grandparent AP 230 MAC address, and the great grandparent AP 220 MAC address as follows:

TABLE 6

| ID | len: 18 | Ver | A | B | C |
|---|---|---|---|---|---|

In operation, a non-conventional AP, i.e., repeater AP, can associate with a conventional AP or other repeater AP. In an embodiment, for a repeater AP to associate with either a conventional or other repeater AP as a potential parent AP, the repeater AP first provides the potential parent AP with a Parent Address List (PAL) sub-IE in a MSFT IE with all IEEE 802.11 authentication and association management packets. The PAL sub-IE must match exactly with the PAL sub-IE retrieved in the beacon/probe response from the potential parent AP that it wants to associate and include the potential parent AP's address. Additionally, a potential parent AP provides a PAL sub-IE in an IEEE 802.11 authentication/association management packet that must match the data in a beacon/probe response.

One format appropriate for a Parent Address List Sub-IE is shown below in table 7.

TABLE 7

Parent Address List Sub-IE Format

| OUI Subtype PAL (0x1) | Length | Version | Information Element Value |
|---|---|---|---|
| 1 byte | 1 byte | 1 byte | 0~18 bytes |

In an embodiment, a PAL Sub-IE can provide up to three parent addresses based on the associated AP's position in the AP extension list. Thus, following the format provided above in Table 7, the maximum size of a PAL sub-IE can be 18 bytes.

A conventional wired AP configured to be the root of the AP extension list does not have any parent and will only have a Sub-IE header with Sub-IE length as 0.

For a repeater AP below the root, a sub IE can provide the MAC addresses from the root (conventional wired AP) to a repeater's direct parent. Thus, the maximum depth of an AP extension list according to an embodiment is four (conventional AP as root, two levels of repeater parents and the repeater AP itself). When a repeater AP receives beacon/probe response packet from another AP that contains three parent addresses in a PAL, the repeater AP is configured to avoid associating with that AP.

One of the purposes of PAL is to avoid having break potential ring when repeater APs try to choose a potential parent AP with which to associate. Also, the PAL avoids having a higher level AP "chase the tail" of the AP list because of the previous disconnection from its PAP. When a repeater AP chooses a particular conventional or repeater AP as its PAP and associates with it, the repeater AP records the PAP's PAL sub-IE plus PAP's MAC address. If the repeater finds that its own MAC address is in the list, there is a potential ring, and the repeater can be configured to not choose that AP as its PAP.

Session ID sub-IE will be provided in all AP's beacon/probe response packets. The session ID sub-IE can be implemented as a pseudo-random number chosen by an AP at its starting time. The number uniquely identifies an AP up session and does not change during AP running time until the AP performs a reboot or reset.

All child APs and stations associated with a particular AP can be configured to record the session ID to determine whether an associated AP reboots or resets.

The Session ID sub-IE format is as shown below in Table 8:

TABLE 8

| OUI Subtype Session ID (0x3) | Length(5) | Version | Information Element Value |
|---|---|---|---|
| 1 byte | 1 byte | 1 byte | 4 bytes |

The session ID sub-IE uses a 4-byte integer to identify an AP up session.

Figure 4:
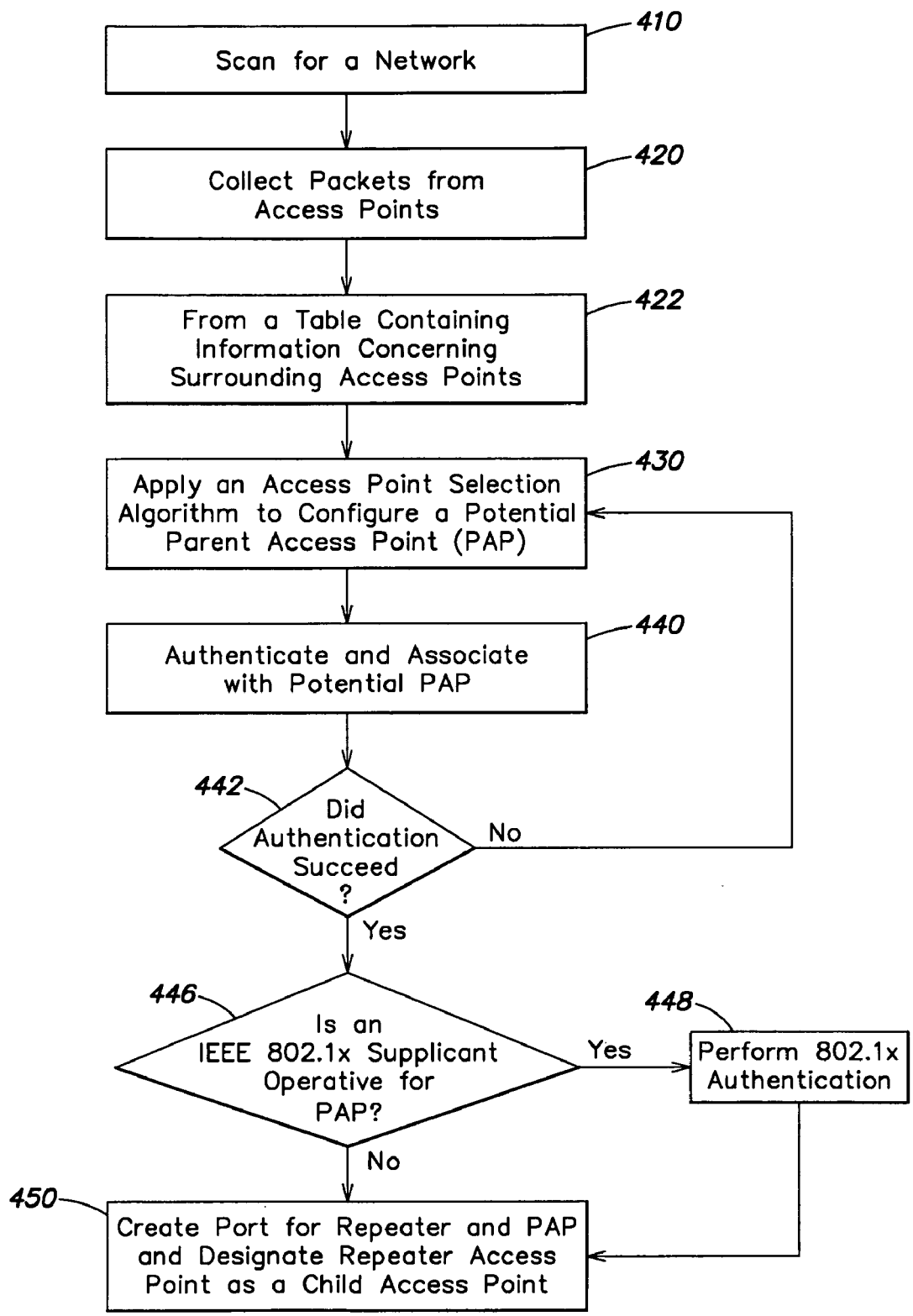
FIG. 4 is a flow diagram illustrating a method according to an embodiment of the present invention.

Referring now to FIG. 4, an embodiment is directed to a method for networking a wireless access point. More particularly, the method is directed to a repeater access point startup method. A potential wireless repeater would have an option to operate as an access point as a repeater. Block 410 provides for the wireless access point to scan for a network in accordance with IEEE 802.11d multi regulatory domain support settings. The repeater scans to search for a predetermined service set identifier (SSID) that provides the name of a network that the repeater desires to connect with. 32-character unique identifier attached to the header of packets sent over a WLAN that acts as a network identifier when a mobile device tries to connect to the BSS. The SSID differentiates one WLAN from another, so all access points and all devices attempting to connect to a specific WLAN must use the same SSID. A device will not be permitted to join the BSS unless it can provide the unique SSID. Because an SSID can be sniffed in plain text from a packet it does not supply any security to the network. The scan can be configured similarly to the type of scan a station would perform upon boot up to find an access point, as is known. The scanning can include creating a list of candidate parent access points. For example, the repeater can collect beacon packets from other APs (both repeater APs or conventional APs), which contain Microsoft Information Elements (MSFT IE) and advertise the same SSID as Repeater AP's desired SSID. A repeater AP can then form a. table containing information concerning the APs in the network identified by the SSID.

Block 420 provides for the wireless access point to collect one or more packets from one or more access points. The packets received that are capable of enabling the networking of the access point and include the MSFT IE as described above. Thus, the packets identify the network and identify whether the one or more access points are wireless or wired. Further, each of the one or more packets includes a MAC layer address identifying an ancestry of the access points to an ancestral wired access point.

Block 422 provides that the repeater AP forms a table containing the information concerning the APs around the repeater AP.

Block 430 provides for applying an access point selection algorithm to select a parent access point (PAP) from the one or more access points, the parent access point having an ancestry independent of the wireless access point. The selection algorithm selects a best PAP via one or more or a combination of signal strength, traffic load, position of the access point in a spanning tree and a random selection.

Block 440 provides for authenticating and associating with the potential parent access point, the authenticating can include performing an open system or a shared key authentication according to the IEEE 802.11 specification authentication and association protocol.

Decision block 442 provides for determining whether the authentication succeeded. If so, block 444 provides for performing an association. If not, the method provides for returning to block 430. Further, if an authentication is successful, block 446 provides for determining whether or not an IEEE 802.1x supplicant is operating as a client to the PAP. If so, an IEEE 802.1x authentication must also be made in block 448. After associations are made, the repeater AP performs an AP-JOIN request, which is a request by a repeater AP to attempt to synchronize with the selected PAP first before attempting to perform IEEE 802.11 authentication and association to insure that the repeater is on the same channel with the associated PAP. Only after IEEE 802.11 association is successfully completed would IEEE 802.1x authentication happen, if required. In one embodiment, the locating and authentication of a PAP is subject to a timeout and retry period, which can be approximately 30 seconds, or according to system requirements.

Block 450 provides that for both the repeater AP and the PAP, a port is created and opened according to the IEEE 802.11 specification. The repeater AP can then be designated as a Child AP (CAP) of the PAP.

As a CAP, the repeater AP can start sending out beacon packets or probe response packets when probe request packets received. The beacon or probe response packets should contain MSFT IE, which contains sub IE indicating that it is a Repeater AP and sub IE containing the Parent Address List (PAL) listing the PAP to which it is associated. The repeater AP, if working normally, will be able to accept authentication/association requests from stations, and transmit and receive data packets.

After setting up a repeater AP, the system determines whether or not the established repeater AP keeps receiving beacon packets within a predetermined amount of time. If no beacon packets are received, or the packets contain an incorrect SSID, or the beacon packets sent from the PAP contain PAL that does not match its own record, the repeater AP performs a reset. In other words, if there is any change in the PAL sub-IE such that the PAL sub-IE mismatches with a recorded PAL list, the repeater AP disconnects from its PAP, breaks every association with any station or CAP, and then resets internally and restarts the PAP search and association operation.

To disconnect, the repeater AP performs a reset call to an underneath network interface card (NIC) and stops sending beacon packets, and then performs a reset call to itself. The reset call causes a cleanup of association information, any key table, an AP information table, packet filters and any other internal tables, states or settings.

After the reset, the repeater AP sleeps for a predetermined period of time. In one embodiment the time is approximately 30 seconds, after which, the method of FIG. 4 is performed again.

Figure 5:
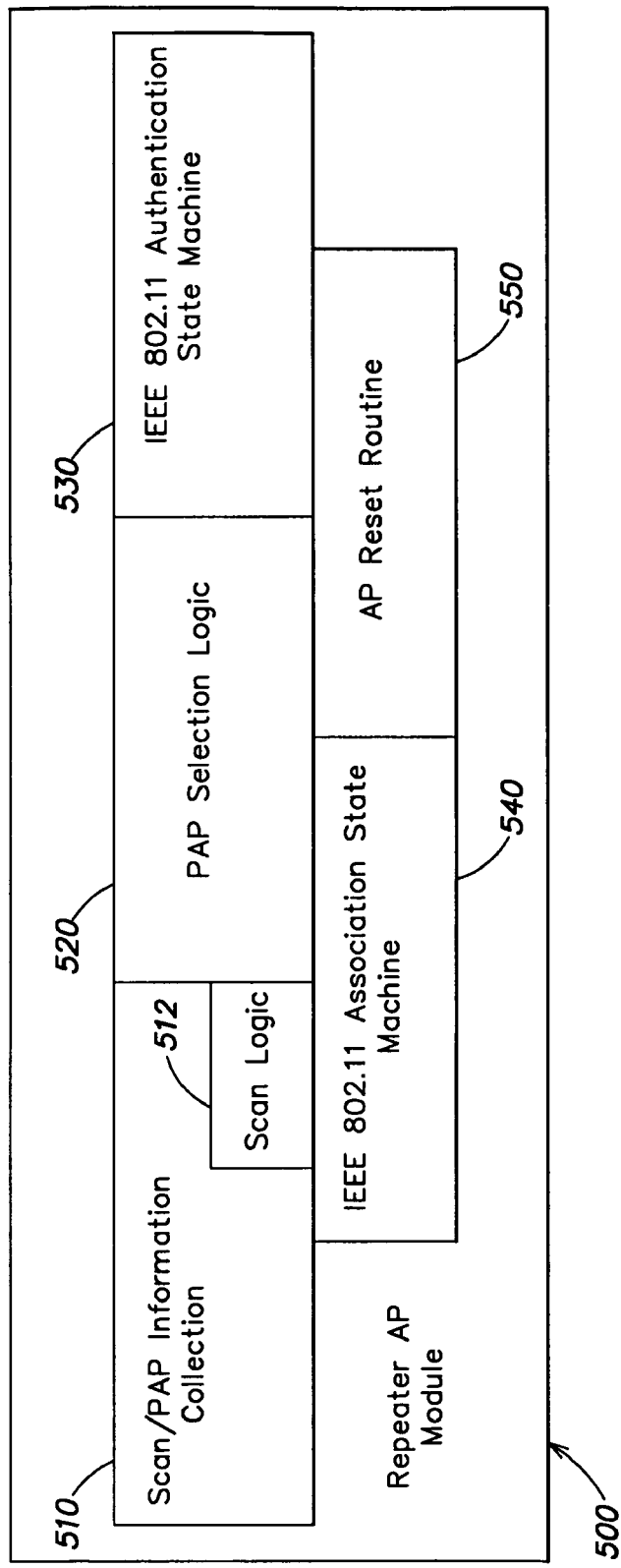
FIG. 5 is an architecture for a repeater access point according to an embodiment of the present invention.

Referring now to FIG. 5, an architecture for a repeater AP module 500 is shown. The module includes scan/PAP information collection 510, PAP selection logic 520, an IEEE 802.11 authentication state machine 530, an IEEE 802.11 association state machine 540 and an AP reset routine 550.

Module 500 performs IEEE 802.11 authentication and association with its Parent AP and coordinates with an IEEE 802.1x supplicant to authenticate itself if applicable.

In general, when a repeater AP is initialized, module 500 enables the repeater AP to associate with one of any existing APs, and IEEE 802.1x authentication if needed. After an association is established or the IEEE 802.1x port for PAP is opened, a repeater AP can perform a start request, send out beacon/probe response and accept authentication and association requests from stations or child APs. If a repeater AP cannot set up an association with its parent AP successfully, an embodiment directs that the repeater AP repeats the attempts periodically until association success or being shut down.

Scan/PAP information collection 510 includes scan logic 512 configured to issue a scan request to an underlying NIC. The scan enables the repeater AP to collect AP information.

Figure 6:
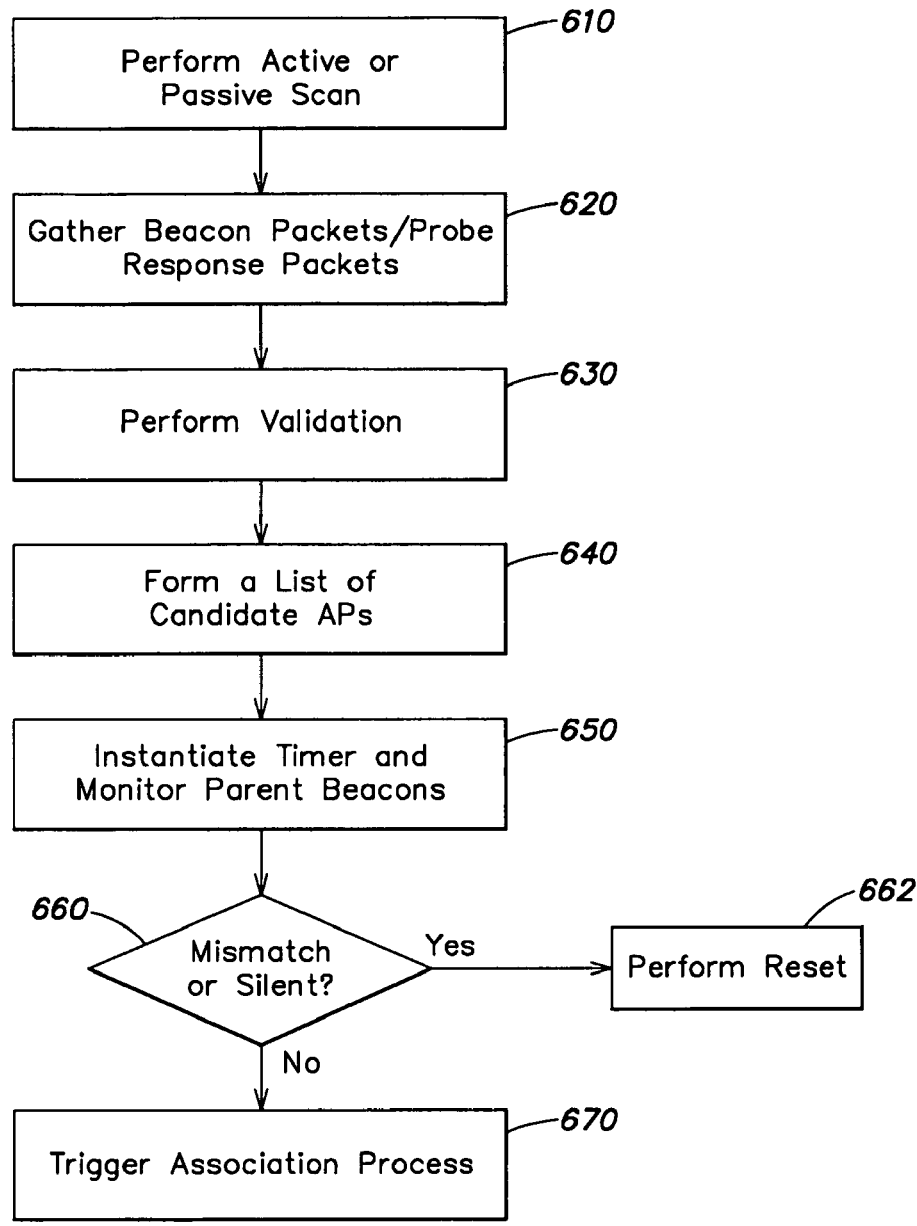
FIG. 6 is a flow diagram illustrating a method for a scan/parent access point information collection according to an embodiment of the present invention.

Referring to FIG. 6, a flow diagram illustrates a method for scan/PAP information collection 510. Block 610 provides that an active or passive scan occurs, for example, according to a IEEE 802.11d multi regulatory domain support setting. Block 620 provides that during and after the performing of a scan request, the repeater AP gathers an existing AP's beacon packets (in passive scan) or probes a response packet (in an active scan). Block 630 provides for performing validation. Block 640 provides for forming a list of candidate APs.

After the repeater AP is associated and started, block 650 provides that AP information gather logic instantiates a watchdog timer routine and a monitoring routine to monitor the parent AP's beacon packets. Decision block 660 provides for determining whether a mismatched beacon was sent from a PAP, or a PAP's beacon could not be heard for a predetermined period of time. If so, block 662 requires that the repeater AP performs a reset to prevent possible tail chasing or dead parent AP, as discussed above with reference to FIG. 4.

Block 670 provides that, upon the completion of scan, the completion routine triggers the association process.

Referring back to FIG. 5, after the method of FIG. 6 is performed, PAP selection 520 operates to filter and sort the collected AP information in an AP information table inside module 500. Only APs that advertise an MS IE with a PAL Sub IE can be chosen to be a parent AP candidate. All other APs are filtered out during the association process.

AP information sorting is used to give different priorities to different parent AP candidates, such as criteria to minimize the number of hops to a CAP, for example. More particularly, first, a repeater AP tries to associate with a determined best parent according an algorithm, as discussed above.

IEEE 802.11 Authentication State Machine 530 is configured to perform IEEE 802.11 open system or shared key authentication. State machine 530 provides that a repeater AP performs as a station and the parent AP acts as an AP. The MSIE and PAL Sub IE are included in each authentication packet. Both repeater AP and parent AP validate the PAL Sub IE for confirming a match.

Authentication state machine 530 exposes application programming interfaces (APIs) to configure, initiate and drive state machine 530. In particular, in one embodiment, the APIs include a SoftAPPAMAuthentication API, a SoftAPPAMCancelAuthentication API, a SoftAPPAMReceiveAuth API, and a SoftAPPAMAuthCompletion API.

The SoftAPPAMAuthentication API provides an entry point routine to initiates an authentication procedure. Upon initiating the authentication, a selected authentication algorithm will be used and corresponding authentication packet will be sent out to parent AP.

The SoftAPPAMCancelAuthentication API operates to stop and cancel an ongoing authentication procedure. The API causes state machine 530 to reset, timers to stop, and internal date structures to clear and cause temporarily allocated memory to be released.

The SoftAPPAMReceiveAuth API is triggered when a valid IEEE 802.11 authentication packet arrives. The SoftAPPAMReceiveAuth API calls corresponding routines to process the packet based on an authentication algorithm, packet sequence number and state machine 530's state.

SoftAPPAMAuthCompletion API causes a repeater AP to perform a post authentication operation. The API triggers an association process.

IEEE 802.11 Association State Machine 540 performs an IEEE 802.11 association procedure. During this procedure, the repeater AP performs as a station and the parent AP acts as an AP. The association state machine 540 provides that an MSIE and PAL Sub IE is included in every association packet. Both repeater AP and parent AP will validate the PAL Sub IE to ensure a match as expected.

Association state machine 540 also exposes APIs to configure, initiate and drive the state machine. One API, SoftAPPAMAssocation API provides an entry point routine to initiate an association procedure. Upon initiating the authentication, a selected authentication algorithm is used and a corresponding authentication packet is sent out to the parent AP. An association completion routine API is a caller-provided completion routine triggered when an association operation is finished. By default, a SoftAPPAMInternalAssocCompletion API is used, which enables a repeater AP to perform post association operations such as triggering the IEEE 802.1x authentication if an IEEE 802.1x supplicant is running on top, or start the repeater AP if no IEEE 802.1x supplicant exists.

A SoftAPPAMCancelAssociation API operates to stop and cancel an ongoing association procedure. The API causes state machine 540 to be reset, timers to be stopped, and internal date structures to be cleared and temporarily allocated memory to be released.

Referring back to FIG. 5, AP Reset Routine 550 applies when a parent AP beacon is received with mismatched PAL IE; when a parent AP beacon is received with a different session ID; when a parent AP beacon could not be received for a certain period of time; and when a repeater AP is disassociated from a parent AP due to lack of activity beyond a predetermined amount of time.

Reset routine 550 stops any ongoing IEEE 802.11 authentication or association, de-initializes each individual module inside the repeater AP, and issues a reset call to an underlying NIC.

Key Manager and Key Distribution

After a repeater AP is operational and capable of being a PAP and of sending and receiving packets to and from connected stations, according to an embodiment, default cryptographic keys are maintained. The default keys can be configured to be the same keys for CAPs and connected stations. In an embodiment, the keys are maintained by a normal key manager, KeyMgr.

KeyMgr can be configured to maintain a Wireless Encryption Privacy (WEP) key mapping (per-station key) for each CAP as well as any connected normal stations. In one embodiment, the WEP key mappings are distinguished by the station's MAC addresses.

With regard to any keys maintained between the repeater AP and a parent AP, an embodiment requires a different set of keys for communicating between a repeater AP and a PAP. Thus, a repeater AP can be configured to maintain a separated parent default key table to communicate with a PAP by using, for example, difference multicast/unicast default keys.

The default keys for communication with a PAP can be maintained by a different key manager. For example, a repeater's key manager RKeyMgr. In addition, RKeyMgr can be configured to keep an RKeyMgr default key identifier value. User mode services for the repeater AP can be configured to use separate repeater AP input/output controller (IOCTL) routines to set/query parent default keys and the parent default key ID though RKeyMgr. To avoid conflicts, default keys for parent AP can be configured to never be offloaded. The encryption and decryption of packets between repeater AP and the parent AP can be performed in a Native WiFi driver.

KeyMgr maintains the WEP key mapping (per-station key) for a PAP as well as stations connected to the repeater AP. The WEP key mappings can be distinguished by a station's MAC addresses.

Routing Table

According to an embodiment, both a PAP and a repeater AP maintain a routing table maintained by an AP Router module. The AP router module can be configured to determine a next hop to forward a packet with a destination address outside of the AP's local cell.

Figure 7:
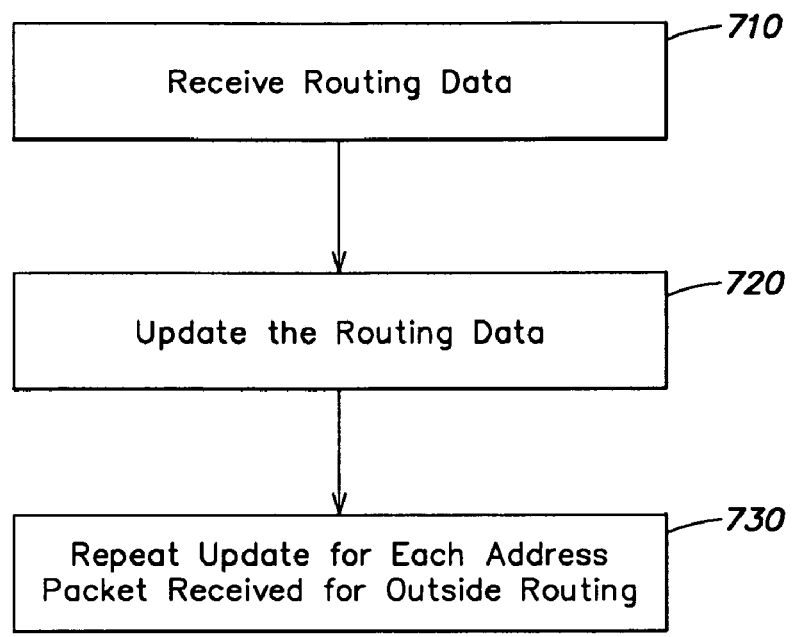
FIG. 7 is a flow diagram illustrating a method for an access point router module according to an embodiment of the present invention.

Referring to FIG. 7, a flow diagram illustrates a method for an AP Router module. Block 710 provides that the module receives routing data. Block 720 provides that the module update the routing data by learning a source address and a transmitting AP's address. The routing data can be in an incoming data packet with up to four. addresses therein. Block 730 provides for repeating the update for each address packet received requiring routing to a station outside of the AP's local cell, which can include a four-address packet.

The structure of the routing table addressed by the router module can be implemented to achieve high performance via a hash table with a link list following each hash entry. In one embodiment, the number of hash entries is set as 64 with a maximum number of routing entry is 128. The routing table can be protected by a read/write lock for synchronization purposes.

In one embodiment, the hash function input is a MAC address. More particularly, the MAC address could be the source address of an incoming four-address data packet for updating, or the destination address in an outgoing four-address data packet for a next hop look-up. The function can be implemented as follows: Hash (MAC)=(MAC0 XOR MAC1 XOR MAC2 XOR MAC3 XOR MAC4 XOR MAC5) mod 64.

For each hash entry, a link list can be provided to link all routing entries with a same hash result to resolve collisions.

The fields in a routing entry for the table can be implemented with a plurality of fields, including a station address, a forward AP address, a last receive time address, and a spin lock field. The station address provides a station's MAC address for indexing. The forward AP address provides the MAC address for a next hop AP. The last receive time field records the last time a valid data packet was received that from a station. The spin lock field is configured to provide synchronization.

The routing table allows operations to be performed, including adding a routing entry, finding a routing entry, a cleaning operation, and a refresh operation.

Figure 8:
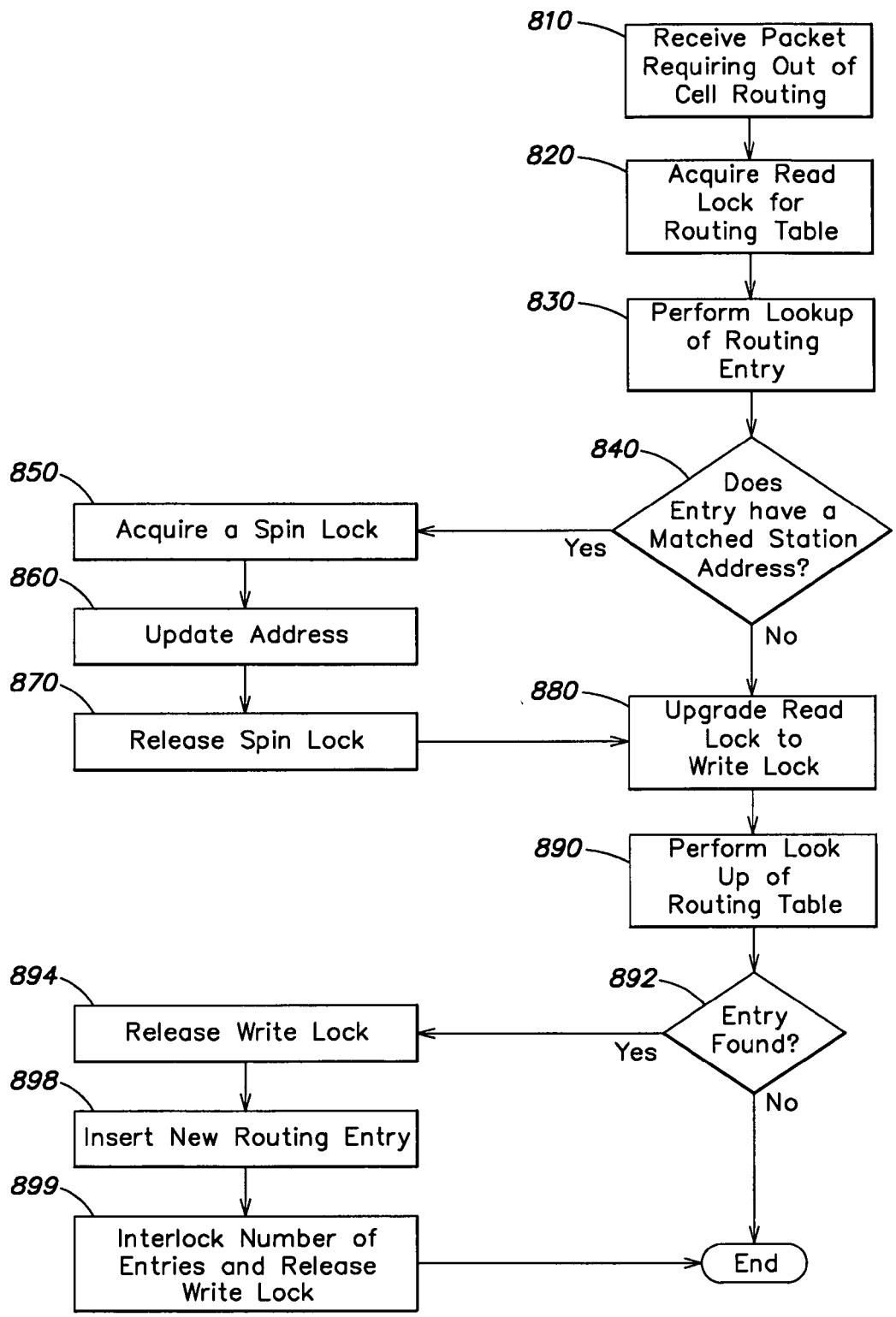
FIG. 8 is a flow diagram illustrating a method for adding a routing entry according to an embodiment of the present invention.

Referring now to FIG. 8, a flow diagram illustrates the operation for adding a routing entry. In an embodiment, adding a routing entry occurs when a packet is received that requires out of cell routing, such as a four-address data packet. Block 810 provides for receiving a data packet requiring an out of cell routing. The input required for the operation includes a station MAC address and an AP MAC address, such as StationMacAddress and APMacAddress.

Block 820 provides for acquiring a read lock of the routing table. Block 830 provides for performing a look up of a routing entry with a matched station address. Decision block 840 provides for determining whether an entry has a matched station address was found. If yes, block 850 provides for acquiring a spin lock of the entry. Block 860 provides for updating a forward AP address and a last receiving time. Block 870 provides for then releasing the spin lock of the entry and returning.

If no entry is found, block 880 provides for upgrading the read lock to a write lock of the routing table. Block 890 provides for performing a lookup for a routing entry in the table with the matched station address. Block 892 provides for determining whether a next entry is found. If so, block 894 provides for releasing the previously set write lock of the routing table. Block 896 provides for determining if the number of entries in the routing table is greater than a maximum number of entries. For example a query of (ulNumOfEntries>ulMaxNumOfEntries) could take place. Block 898 provides for inserting a new routing entry into the routing table and filling in fields. Block 899 provides for interlocking an increment of the number of entries, e.g., interlocking ulNumOfEntries and releasing the write lock of the routing table.

Figure 9:
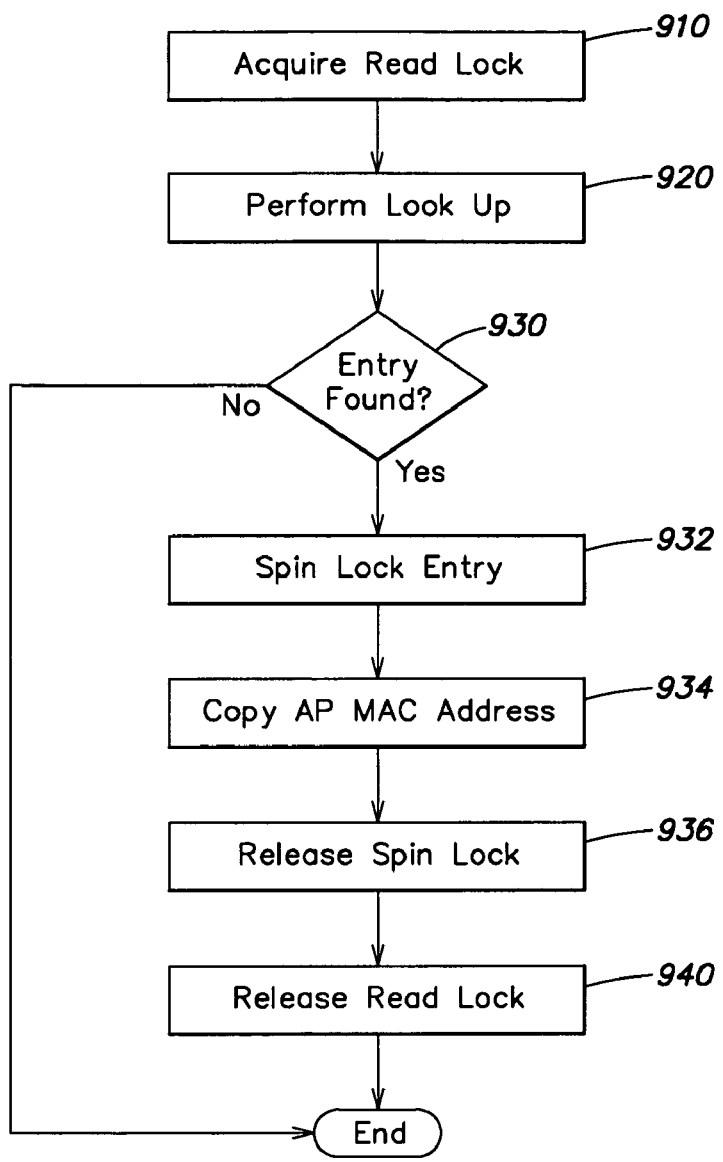
FIG. 9 is a flow diagram illustrating a method for finding a routing entry according to an embodiment of the present invention.

Another function of the routing module includes finding a routing entry. FIG. 9 illustrates a flow diagram of a method for finding a routing entry in the routing table. According to an embodiment, the function is called when sending a packet outside the cell area of an AP, such as when sending a four-address data packet. In an embodiment, the input for the function is a station's MAC address, and the output is an AP MAC address. Block 910 provides for acquiring a read lock of the routing table. Block 920 provides for performing a look up in the table for a routing entry with a matched station address. Decision block 930 determines whether an entry is found. If found, block 932 provides for acquiring a spin lock of the entry. Block 934 provides for copying the AP MAC address data. Block 936 provides for releasing the spin lock of the entry. Block 940 provides for releasing a read lock from the routing table.

Another function of the routing module is a housecleaning function of the table, a table reaper. The function "reaps" out routing entries that are out of date. The housecleaning function can be configured to occur periodically, as can be determined according to system requirements.

Figure 10:
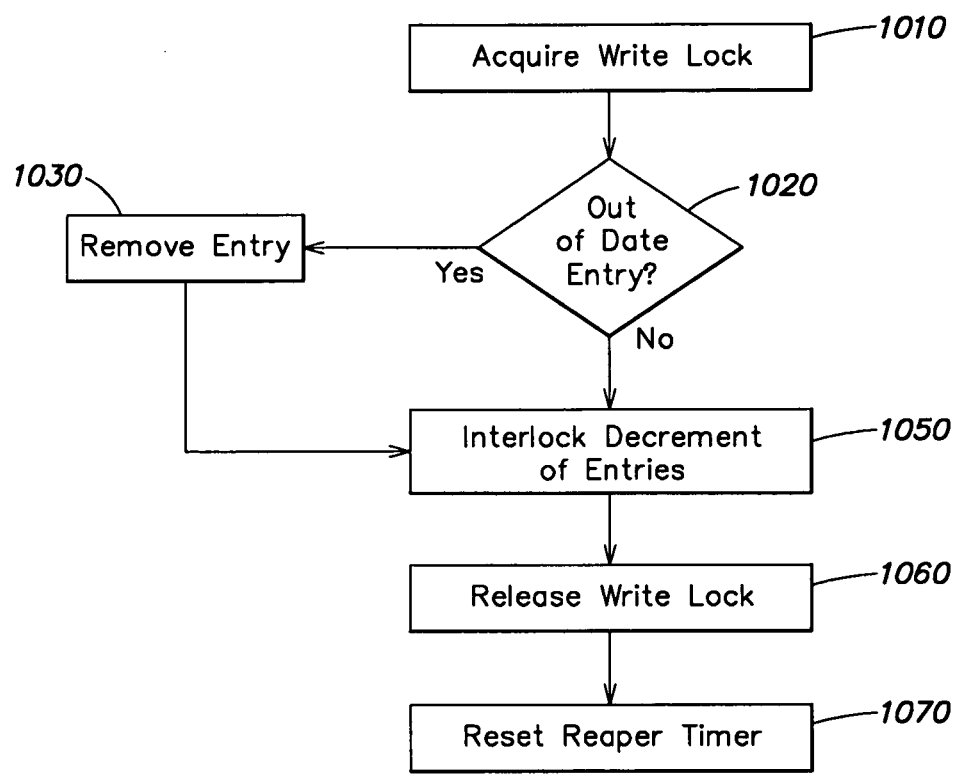
FIG. 10 is a flow diagram illustrating a method for a reaper function according to an embodiment of the present invention.

Referring to FIG. 10, a flow diagram illustrates the reaper function. Block 1010 provides for acquiring a write lock of the routing table. Decision block 1020 provides that, for every routing entry in the routing table, if the entry is out of date, to proceed to block 1030, which removes the entry from the table. Block 1050 provides for interlocking a decrement of the number of entries, ulNumOfEntries. Block 1060 provides for releasing the write lock of the routing table. Block 1070 provides for resetting a reaper timer for a predetermined amount of time for a next housecleaning operation.

Figure 11:
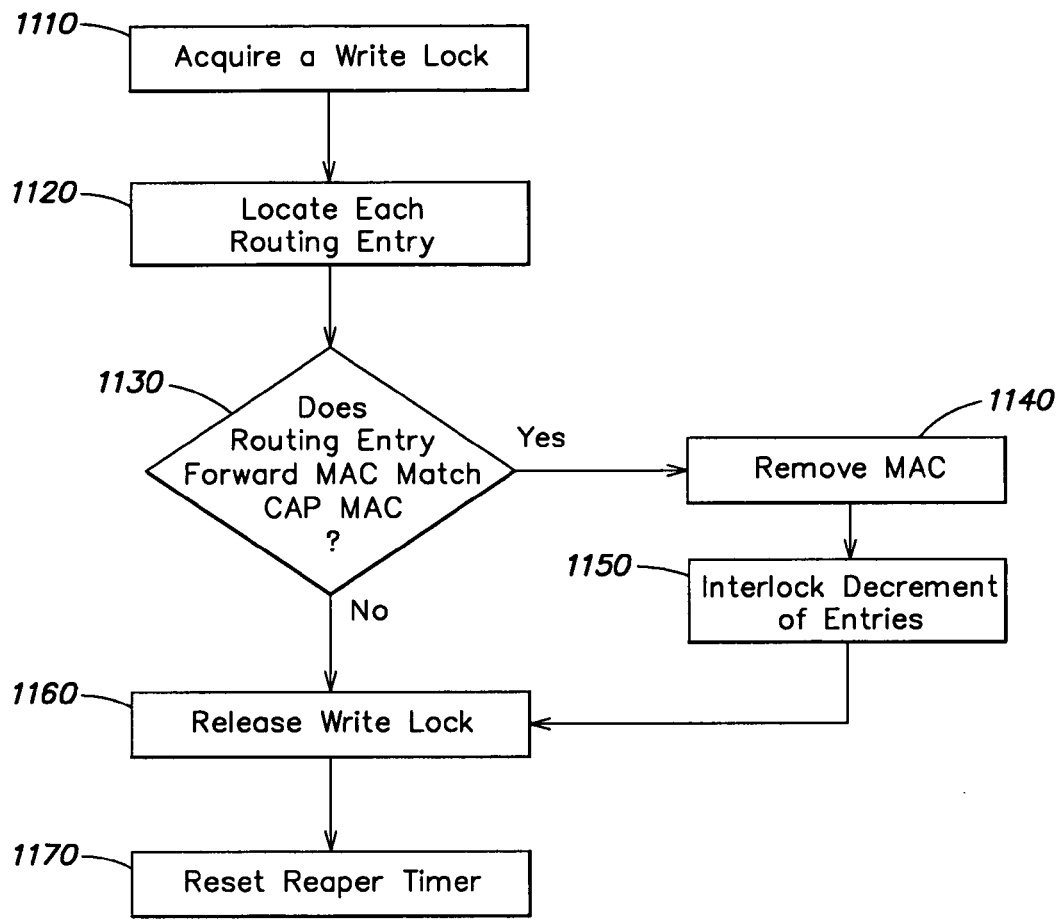
FIG. 11 is a flow diagram illustrating a method refresher function according to an embodiment of the present invention.

Another function of the routing module is to refresh the routing entries with a routing entry refresher. The refresher function can be configured to be called when an associated CAP disconnects from an AP. Referring to FIG. 11, a flow diagram illustrates the method used by the refresher function.

Block 1110 provides for acquiring a write lock of the routing table. Block 1120 provides for locating each routing entry in the routing table. Decision block 1130 determines whether a routing entry's forward AP MAC address matches the CAP MAC address. If so, block 1140 provides for removing the MAC address from the table. Block 1150 provides for interlock decrementing the number of entries, ulNumOfEntries. Block 1160 provides for releasing the write lock of the routing table. Block 1170 provides for resetting the reaper timer.

Transmitting and Receiving by a Repeater Access Point

Referring back to FIG. 2, another embodiment is directed to methods for packet reception and transmission by a repeater AP, such as repeater AP 240, for example. As shown, repeater AP 240 could receive packets from three sources, a PAP, normal stations within the local cell, and associated CAPs that associate with the repeater AP. The types of packets that could be received include management or control packets, IEEE 802.1x data packets, unicast data packets and broadcast/multicast data packets.

Upon receiving a packet, repeater AP can be configured to operate based on the packet type and packet address type.

When receiving packets from a PAP, a repeater AP can be configured to respond by first determining what type of packet is sent. If the packet is an IEEE 802.11 management packet, the packet can be received and processed by repeater AP's parent association manager (PAM). If the packet is an IEEE 802.1x packet, to be processed, the packet is sent from a PAP's IEEE 802.1x authenticator. The packet is received and forwarded to the repeater AP's IEEE 802.1x supplicant.

Figure 12:
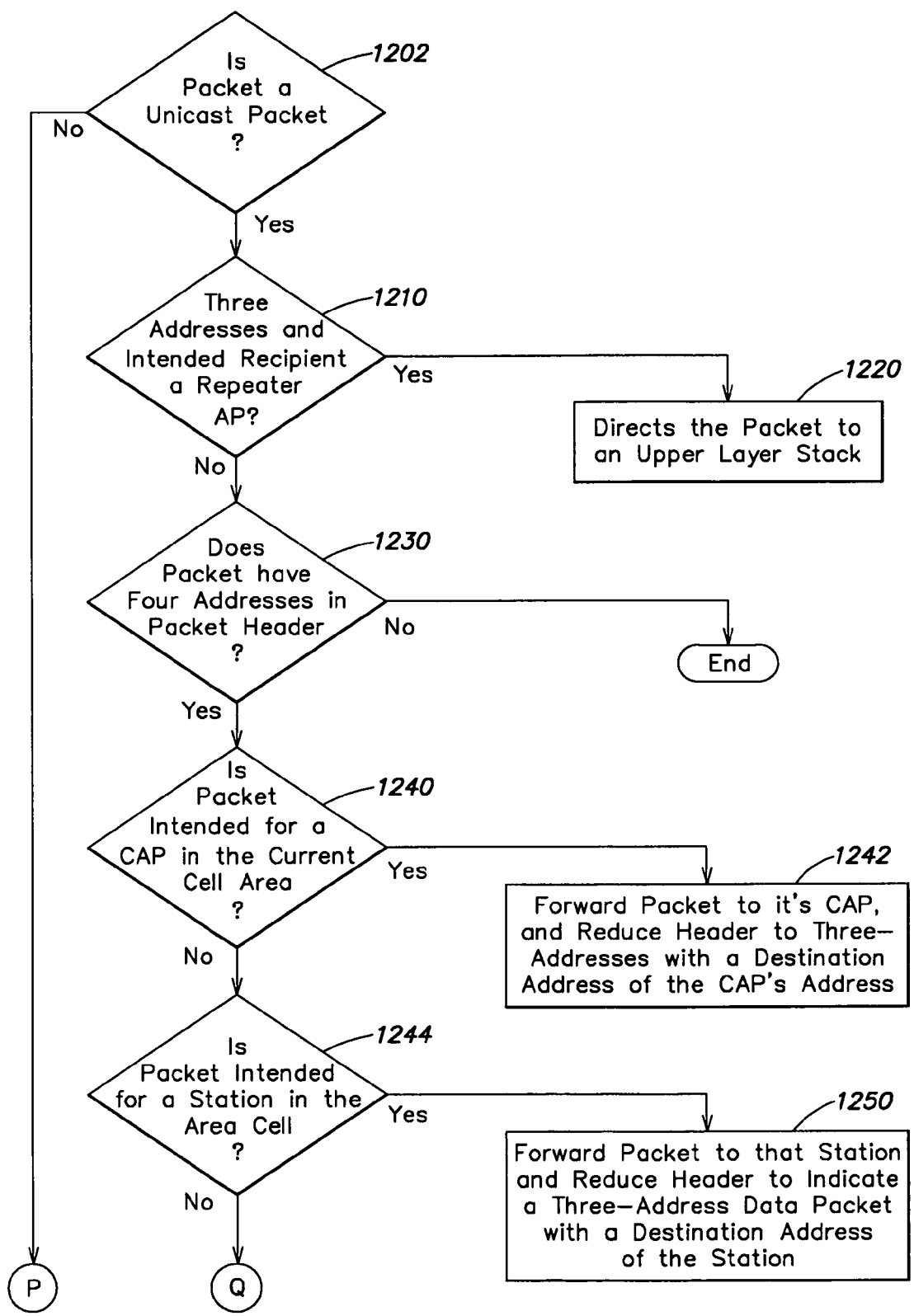
FIG. 12 is a flow diagram illustrating a method for a repeater access point to transmit an IEEE 802.11 data packet according to an embodiment of the present invention.
Figure 12B:
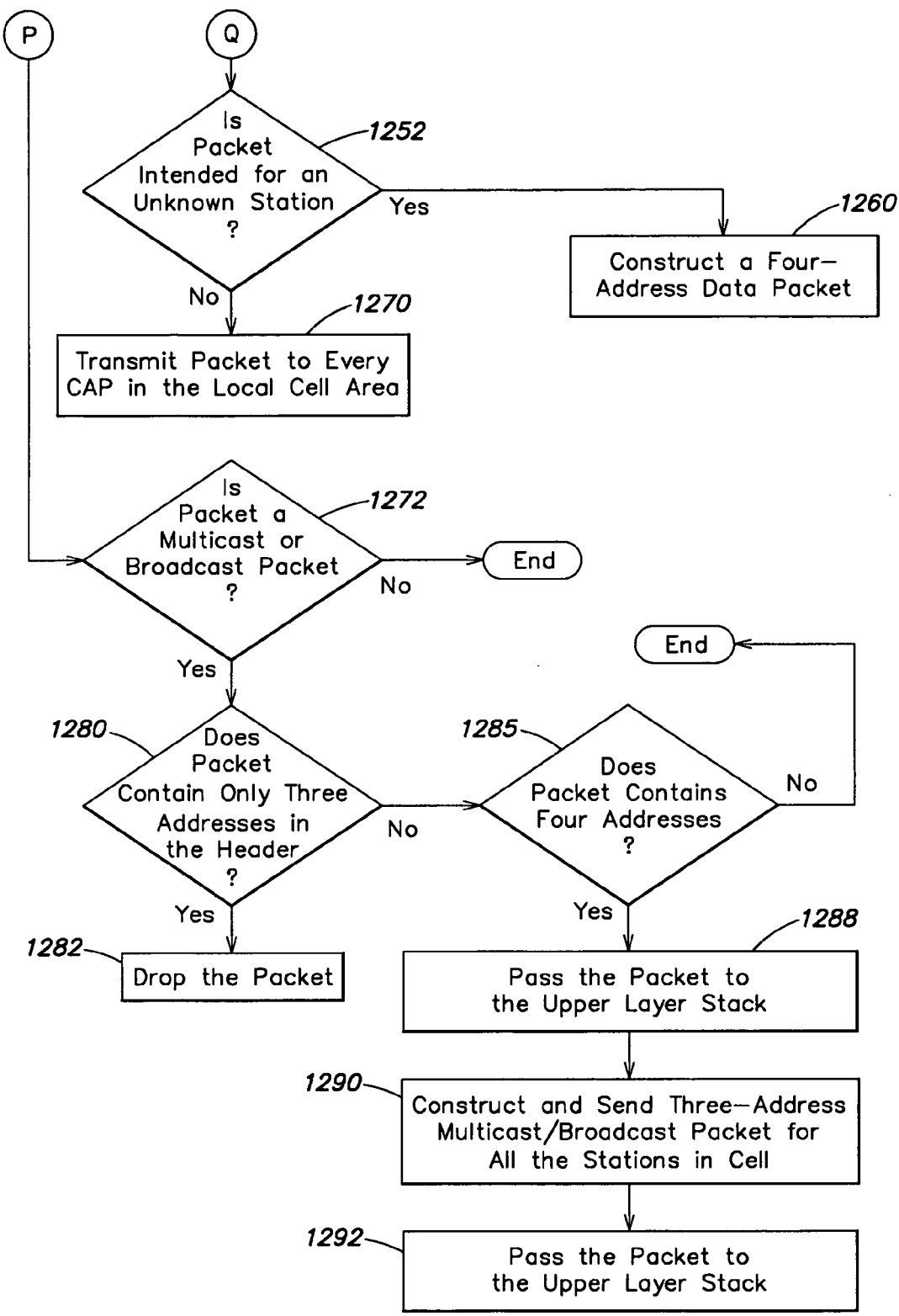

If the packet is an IEEE 802.11 data packet, it is one of two types, either a unicast packet or a multicast/broadcast packet. Referring to FIG. 12, a flow diagram illustrates a method for transmitting IEEE 802.11 data packets. First, block 1202 provides for determining if the packet is a unicast packet. If so, block 1210 provides for determining if there are three addresses and the intended recipient is a repeater AP. If so, block 1220 directs the packet to an upper layer stack. If the packet has four addresses in the packet header in block 1230, block 1240 determines whether the packet is intended for a CAP in the current cell area. If so, block 1242 forwards the packet to its CAP, reducing the header to indicate a three-address data packet with a destination address of the CAP's address.

Block 1244 provides for determining whether the packet header is identified as intended for a station in the area cell. If so, block 1250 directs that the repeater AP forward to the packet to that station, reducing the header to indicate a three-address data packet with a destination address of the station.

If the packet is intended for an unknown station, block 1260 directs that the repeater AP construct a four-address AP-to-AP data packet. Block 1270 provides for transmitting the data packet to every CAP in the local cell area.

Block 1272 provides for determining whether the packet is a multicast or broadcast packet. If so, block 1280 provides for determining whether the data packet contains only three addresses in the header. If so, block 1282 provides for the repeater AP to drop the packet. Block 1285 provides for determining whether the data packet contains four addresses. If so, block 1288 provides that the repeater AP pass the packet to the upper layer stack. Next, block 1290 provides for constructing and sending a three-address multicast/broadcast packet for all the stations in repeater AP's cell. Next block 1292 provides for constructing and sending a four address multicast/broadcast packet for all the CAPs in repeater AP's cell.

Figure 13:
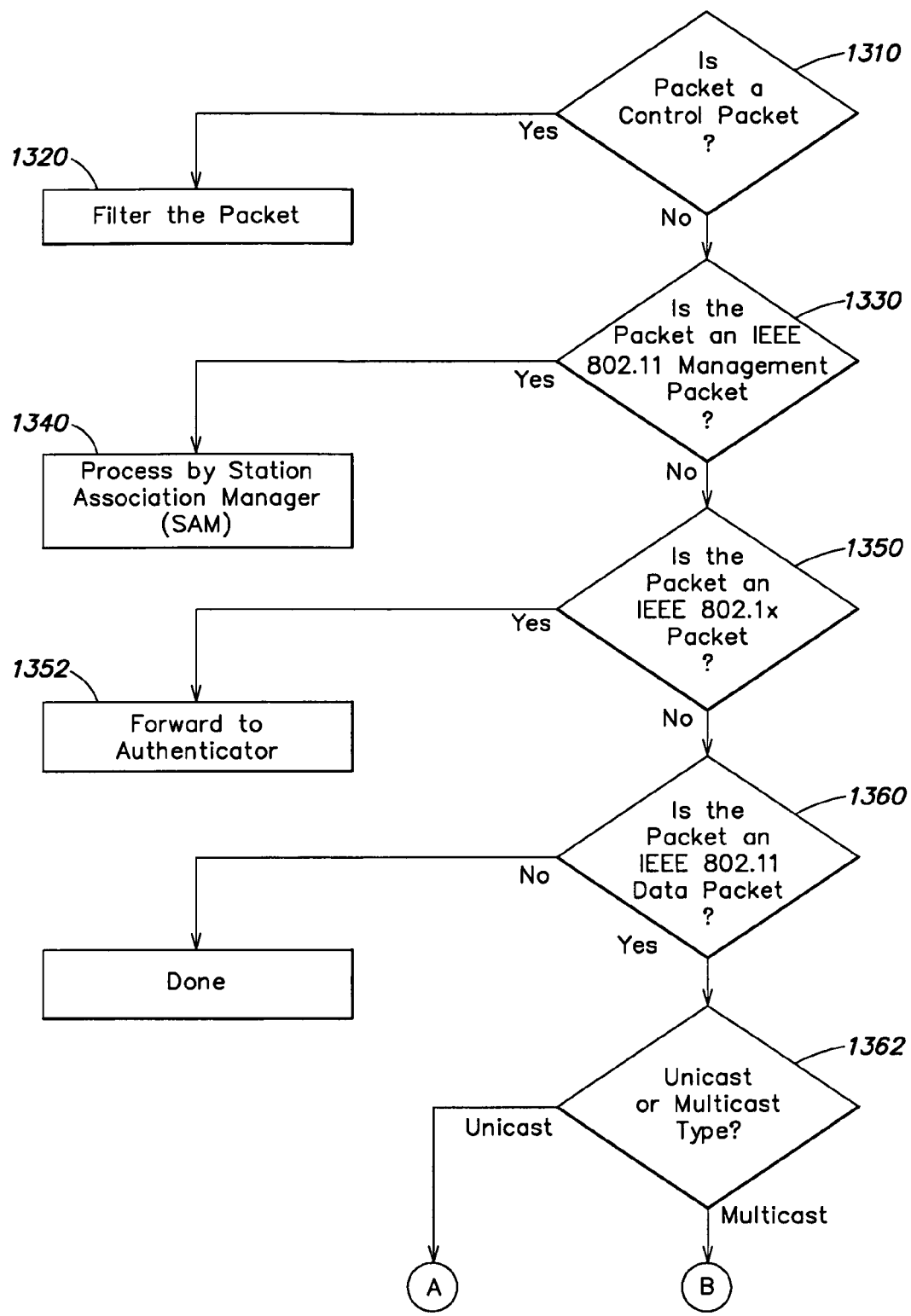
FIG. 13 is a flow diagram illustrating a method for a repeater access point receiving packets from stations in its cell according to an embodiment of the present invention.
Figure 13B:
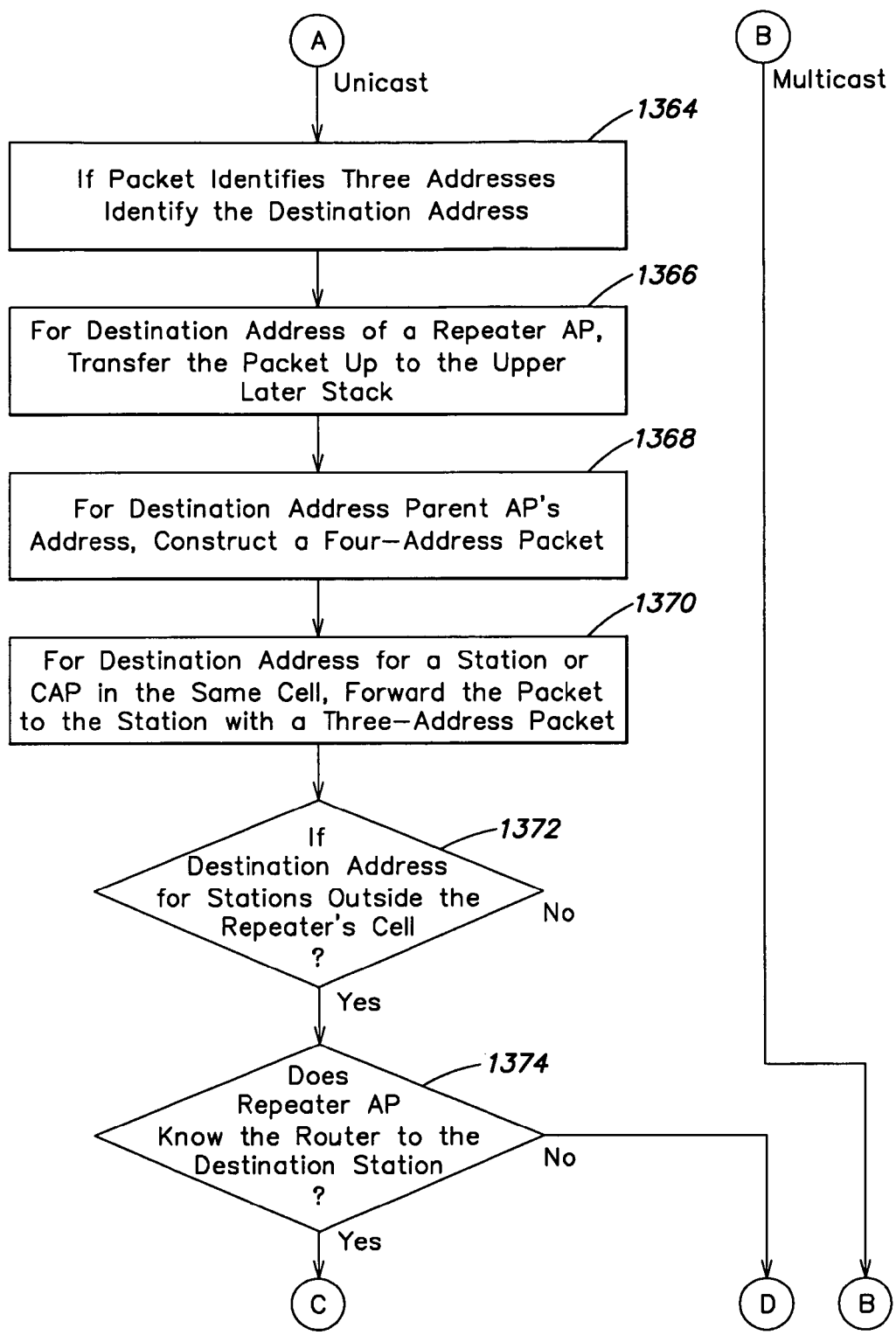
Figure 13C:
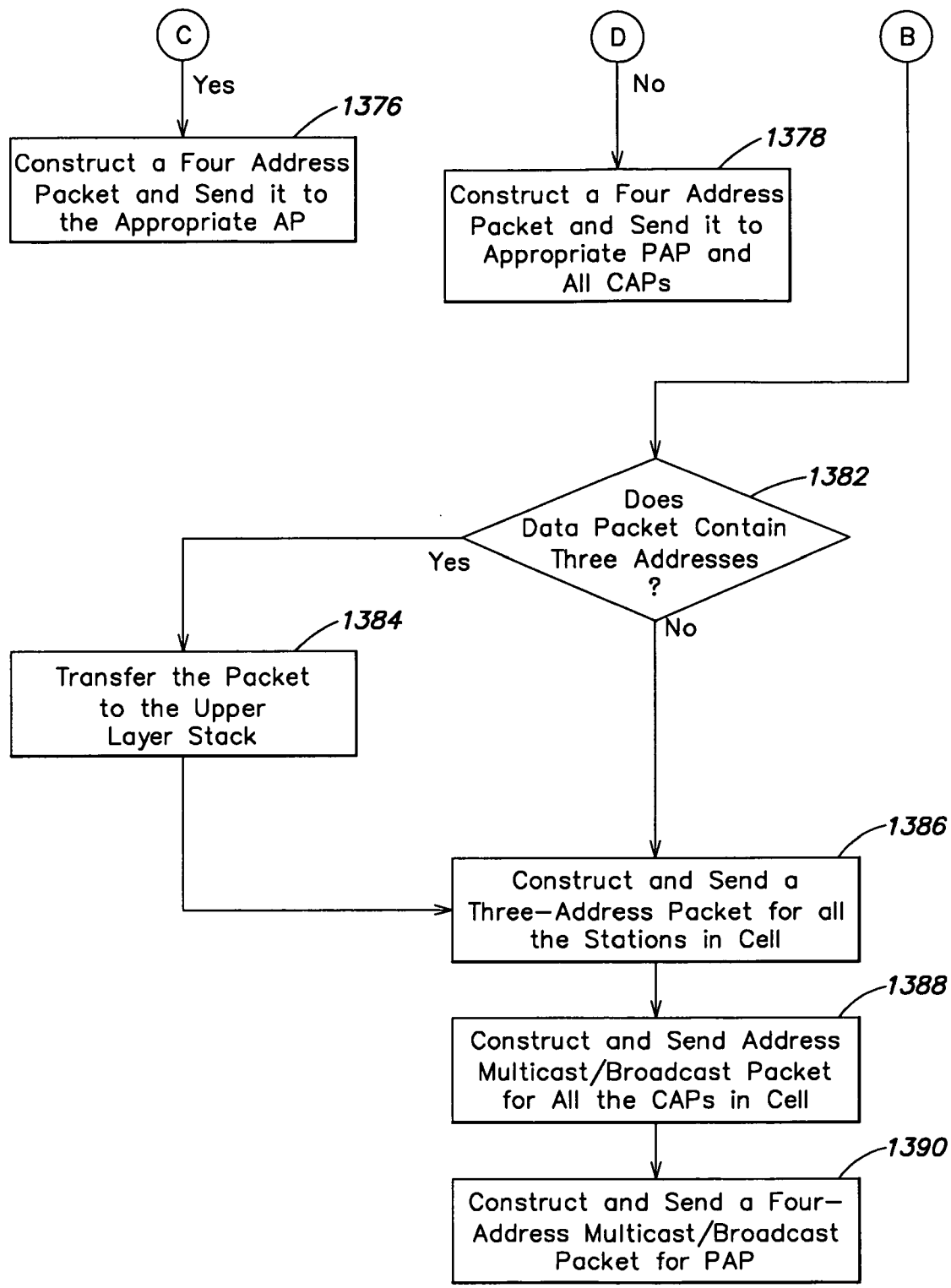

Referring now to FIG. 13, another method is directed to a repeater AP receiving packets from stations in its cell area instead of from a PAP Block 1310 provides for determining if the packet is a control packet. If so, block 1320 provides for filtering the packet by the repeater AP's packet filter because all control packets are processed by the NIC driver and will not be forwarded to Native Wireless Fidelity (WiFi) driver. Block 1330 provides for determining if the packet is an IEEE 802.11 management packet. If so, block 1340 provides that the packet will be received and processed by repeater AP's station association manager (SAM).

Block 1350 provides for determining if the packet is an IEEE 802.1x packet. If so, block 1352 provides for determining whether the packet was sent from station's IEEE 802.1x supplicant, and then forwarding the packet to repeater AP's IEEE 802.1x authenticator.

Block 1360 provides for determining if the packet is an IEEE 802.11 data packet. If so, block 1362 provides for determining if the packet header is a unicast or multicast type packet. If it is a unicast and the packet identifies three addresses, block 1364 provides for identifying the destination address. If the destination address is a repeater AP's, block 1366 provides for transferring the packet up to the upper layer stack.

If the destination address is the Parent AP's address, block 1368 provides for constructing a four-address packet and sending it to the parent AP.

If the destination address is for a station or CAP in the same cell, block 1370 provides for forwarding the packet to the station with a three-address packet.

If the destination address is for stations outside the repeater's cell, the method passes to block 1372. Block 1374 provides for determining if the repeater AP knows the router to the destination station. If so, block 1376 provides for constructing a four-address packet and sending it to the appropriate AP, which could be a CAP or a PAP. Block 1376 provides for determining whether the station is unknown to the repeater AP. If so, block 1378 provides for constructing four address packets and sending to the associated PAP and all CAPs respectively.

If block 1362 provides that a packet is multicast/broadcast, block 1382 provides for determining whether the data packet contains three addresses. Next, block 1384, the repeater AP transfers the packet to the upper layer stack, in block 1386 constructs and sends a three-address multicast/broadcast packet for all the stations in repeater AP's cell. In block 1388, repeater AP constructs and sends address multicast/broadcast packets for all the CAPs in repeater AP's cell respectively. In block 1390, repeater AP constructs and sends a four-address multicast/broadcast packet for its PAP.

Figure 14:
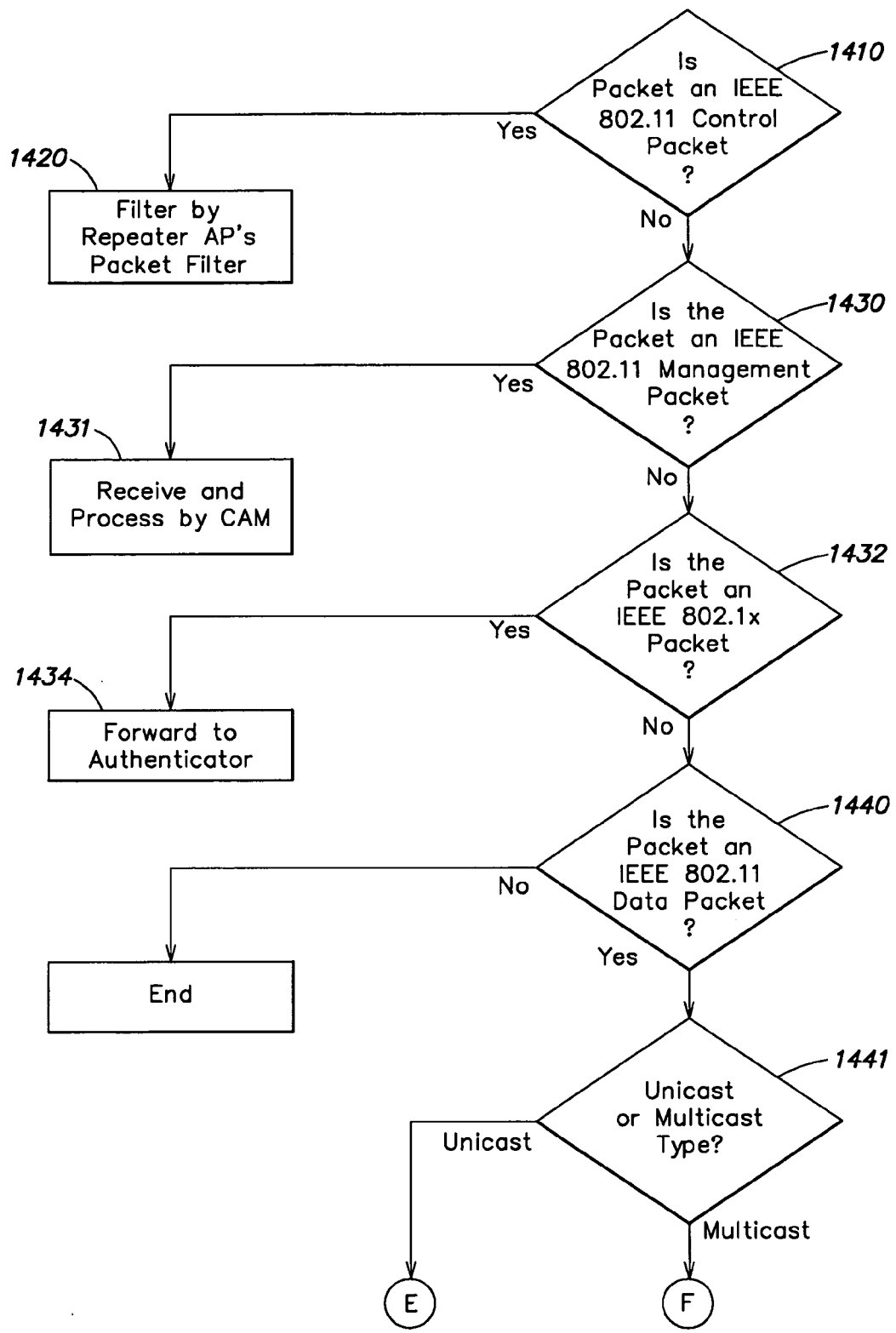
FIG. 14 is a flow diagram illustrating a method for a repeater access point receiving packets from a child access point according to an embodiment of the present invention.
Figure 14B:
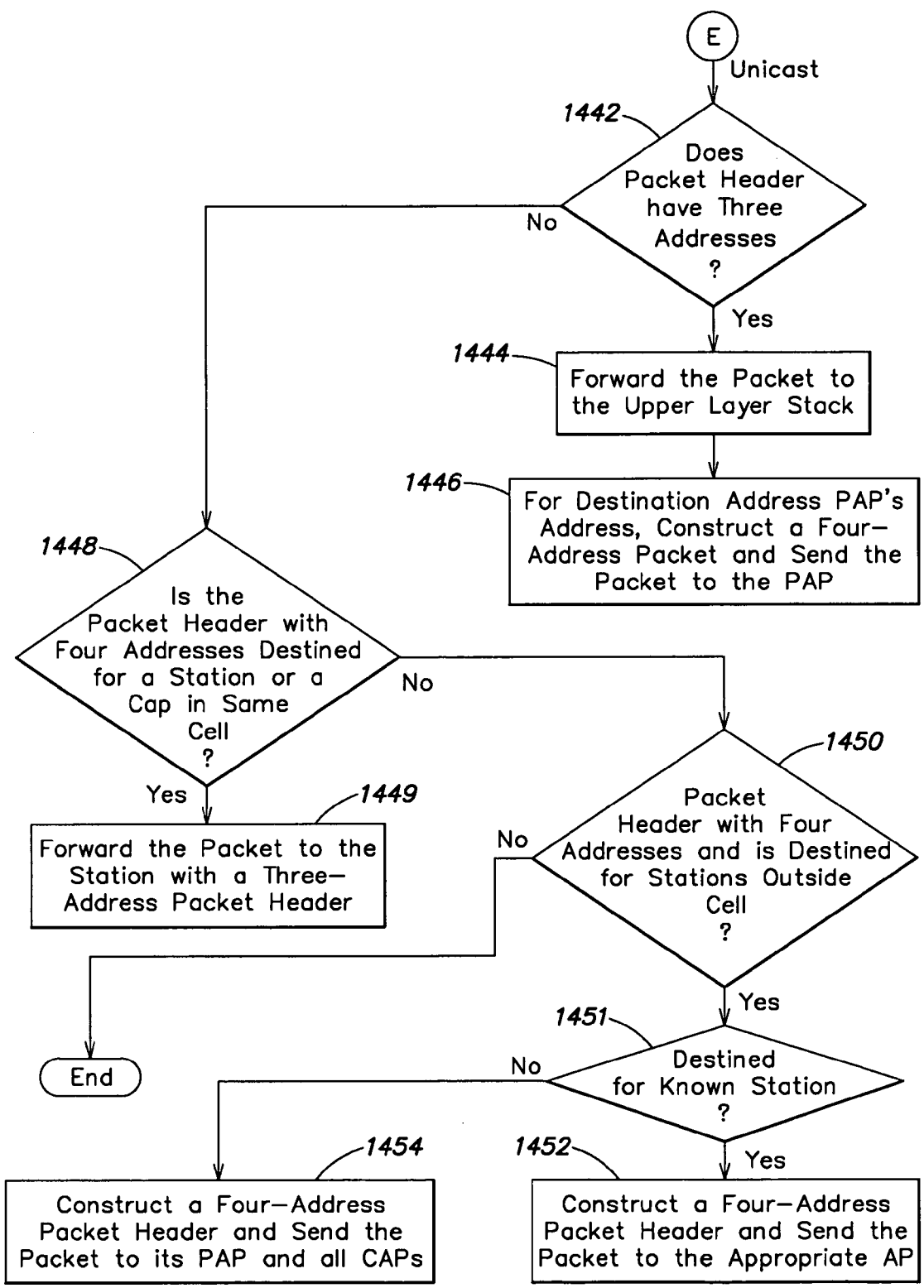
Figure 14C:
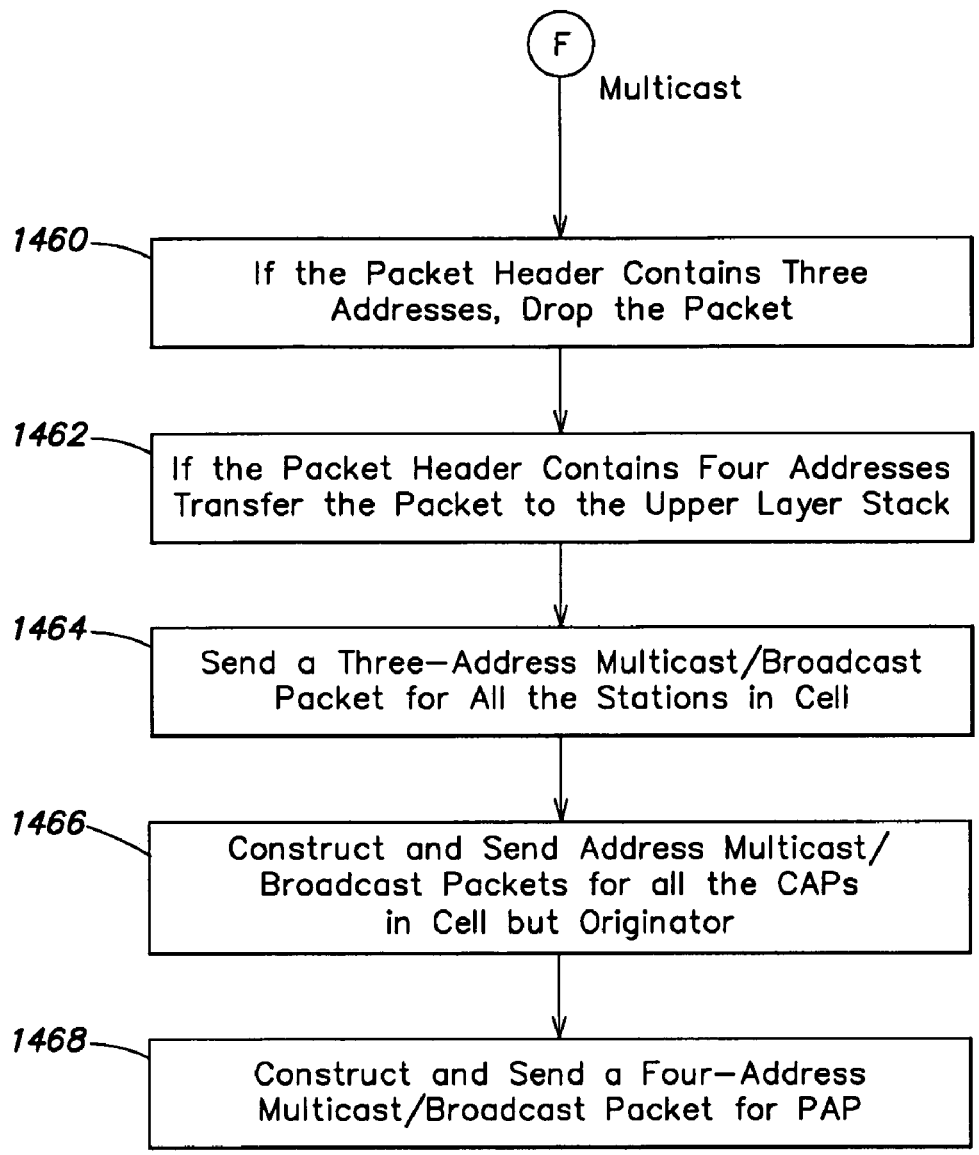

Referring now to FIG. 14, a flow diagram illustrates a method for a repeater AP receiving packets from its CAP.

Block 1410 provides for determining if the packet is an IEEE 802.11 control packet. If so, block 1420 provides for filtering by repeater AP's packet filter because all control packet can be processed by the NIC driver and will not forwarded to Native WiFi driver.

Block 1430 provides for determining whether a packet is an IEEE 802.11 management packet. If so, block 1431 provides for receiving and processing by repeater AP's child association manager (CAM).

Block 1432 provides for determining if a packet is an IEEE 802.1x packet. If so, the packet must have been sent from a CAP's IEEE 802.1x supplicant. Therefore, block 1434 provides for receiving and forwarding the packet to the repeater AP's IEEE 802.1x authenticator.

Block 1440 provides for determining if a packet is an IEEE 802.11 data packet and the type of IEEE 802.11 data packet. If so, block 1441 determines whether the data packet is unicast or multicast. If the packet is a unicast packet, block 1442 provides for determining the number of addresses located in the packet header. If the packet has a three-address packet header, the packet is destined for the repeater AP, and block 1444 provides for forwarding the packet to the upper layer stack. If the destination address is the PAP's address, block 1446 provides for constructing a four-address packet and sending the packet to the PAP. Block 1448 provides for determining whether the packet header includes four addresses and the packet is destined for a station or a CAP in the same cell. If so, block 1449 provides for forwarding the packet to the station with a three-address packet header. Block 1450 provides for determining whether the packet header includes four addresses and is destined for stations outside of the repeater AP's cell. If so, block 1451 provides for determining whether the packet is for a known station. If destined for a known station, block 1452 provides for constructing a four-address packet header and sending the packet to the appropriate AP, which could be a CAP or the associated PAP. If the packet is destined for an unknown station, block 1454 provides for constructing a four-address packet header and sending the packet to its PAP and all CAPs respectively, except the CAP from which the data packet comes.

If in block 1441 a packet is determined to be a multicast or broadcast packet, block 1460 provides that if the packet header contains three addresses, the packet is dropped. Next, if the packet header contains four addresses, block 1462 provides for the repeater AP to transfer the packet to the upper layer stack. Next block 1464 provides for the repeater AP to send a three-address multicast/broadcast packet for all the stations in repeater AP's cell. Next block 1466 provides for constructing and sending address multicast/broadcast packets for all the CAPs in repeater AP's cell respectively, except the CAP that sent the data packet. Next, block 1468 provides for constructing and sending a four-address multicast/broadcast packet for its PAP.

Figure 15:
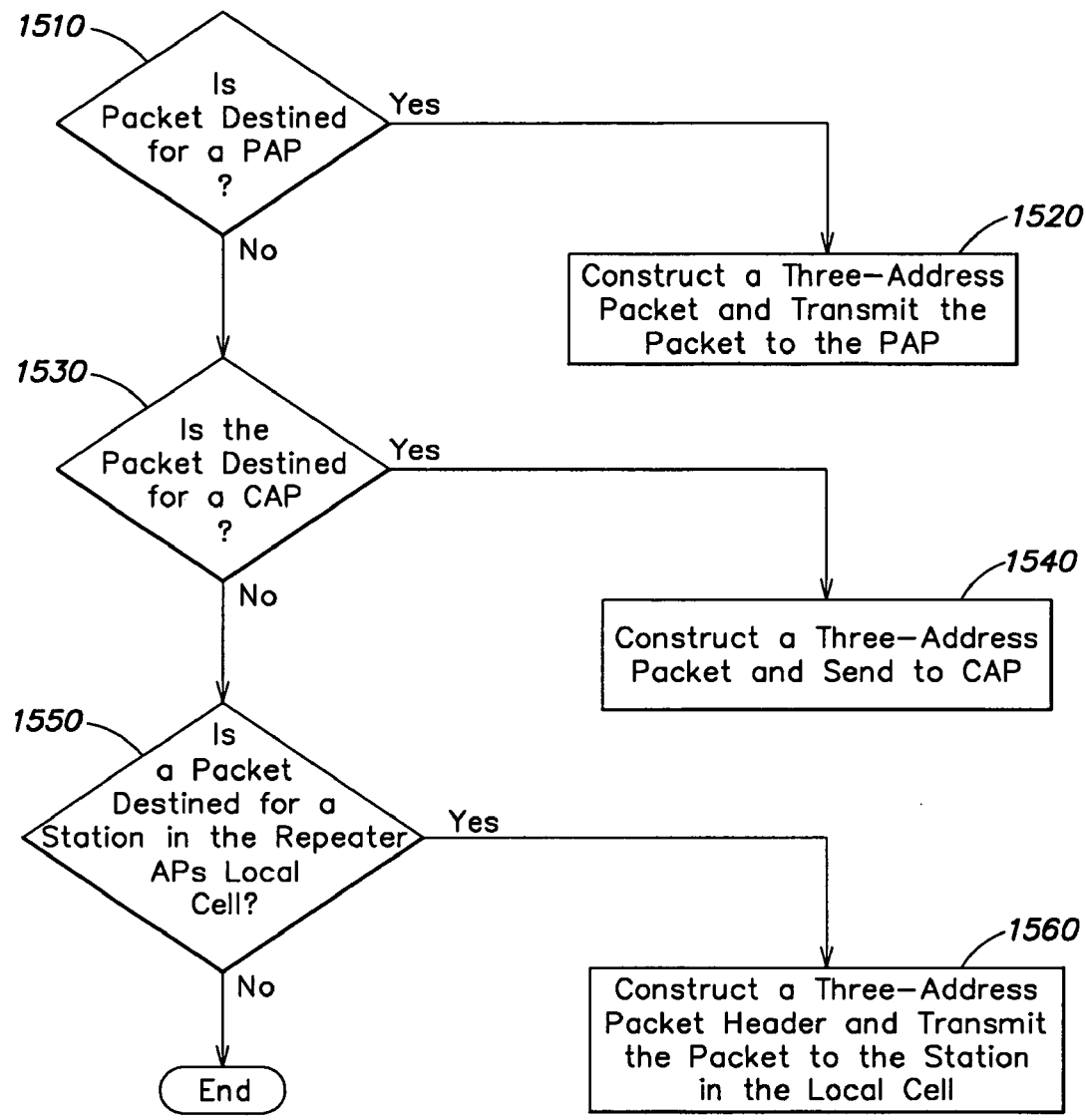
FIG. 15 is a flow diagram illustrating a method for transmitting packets from a repeater access point according to an embodiment of the present invention.

Referring now to FIG. 15, a flow diagram illustrates a method for transmitting packets from a repeater AP. A repeater AP could be configured to generate packets locally and transmit to different destinations. Those packets include IEEE 802.11 management packets, data packets, and IEEE 802.1x packets from either a local supplicant or local authenticator. The packet could have a different destination address, different address types (unicast or multicast/broadcast), and different number of addresses in the packet header. FIG. 15 illustrates a method for a repeater AP for transmitting such packets. Those transmit packet that are to be forwarded follow the methods described above.

One type of packet a repeater can transmit includes an IEEE 802.11 management packet. Block 1510 provides for determining if a packet is destined for a PAP. If so, block 1520 provides for constructing a three-address packet and transmitting the packet to the PAP directly. Block 1530 provides for determining if the packet is destined for a CAP. If so, block 1540 provides for constructing a three-address packet and sending to CAP directly. Block 1550 provides for determining if a packet is destined for a station in the repeater APs local cell. If so, block 1560 provides for constructing a three-address packet header and transmitting the packet to the station in the local cell.

Figure 16:
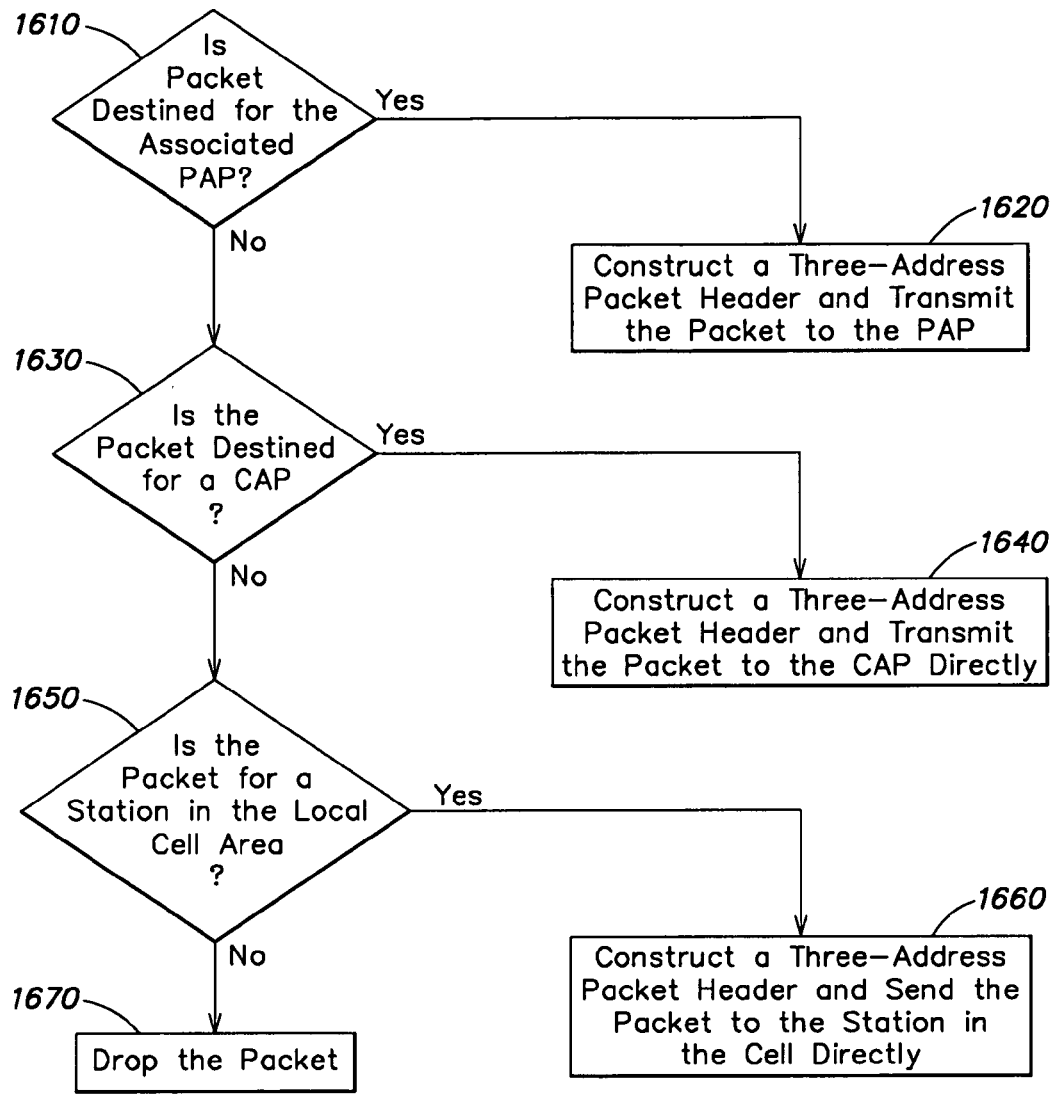
FIG. 16 is a flow diagram illustrating a method for a repeater access point to transmit an IEEE 802.1x packet according to an embodiment of the present invention.

Referring now to FIG. 16, a flow diagram illustrates a method for transmitting an IEEE 802.1x packet. Block 1610 provides for determining whether a packet is destined for the associated PAP. If so, block 1620 provides for constructing a three-address packet header and transmitting the packet to the PAP directly. Block 1630 provides for determining whether the packet is destined for a CAP. If so, block 1640 provides for constructing a three-address packet header and transmitting the packet to the CAP directly. Block 1650 provides for determining if the packet is for a station in the local cell area. If so, block 1660 provides for constructing a three-address packet header and sending the packet to the station in the cell directly. If the packet is destined for a destination other than those identified in blocks 1610, 1630 or 1650, block 1670 provides for dropping the packet.

Figure 17:
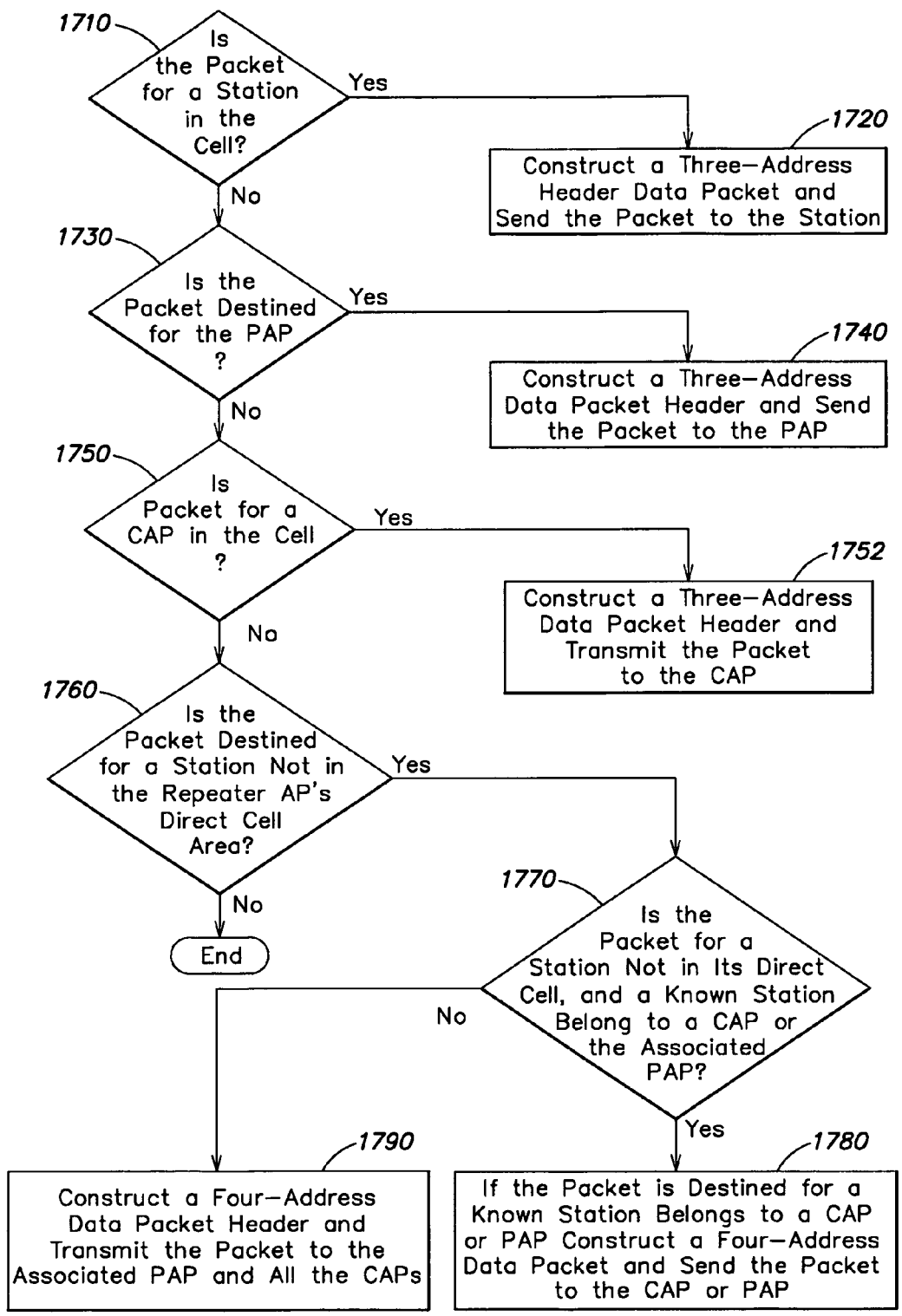
FIG. 17 is a flow diagram illustrating a method for a repeater access point to transmit an IEEE 802.11 unicast packet according to an embodiment of the present invention.

Referring now to FIG. 17, a flow diagram illustrates method for transmitting an IEEE 802.11 unicast data packet. Block 1710 provides for determining whether the packet is for a station in the cell. If so, block 1720 provides for constructing a three-address header data packet and sending the packet to the station directly. Block 1730 provides for determining whether the packet is destined for the PAP. If so, block 1740 provides for constructing a three-address data packet header and sending the packet to the PAP directly.

Block 1750 provides that if the packet is for a CAP in the cell, the repeater AP constructs a three-address data packet header and transmits the packet to the CAP 1752 directly. Block 1760 provides for determining if the packet is destined for a station not in the repeater AP's direct cell area. Block 1770 provides for determining whether the packet is for a station not in its direct cell, and determining whether the packet is for a known station belonging to a CAP or the associated PAP or to an unknown station.

If the packet is destined for a known station belongs to a CAP or PAP, then block 1780 provides for constructing a four-address data packet and sending the packet to the CAP or PAP. If the packet is destined for an unknown station, block 1790 provides for constructing a four-address data packet header and transmitting the packet to the associated PAP and all the CAPs.

Figure 18:
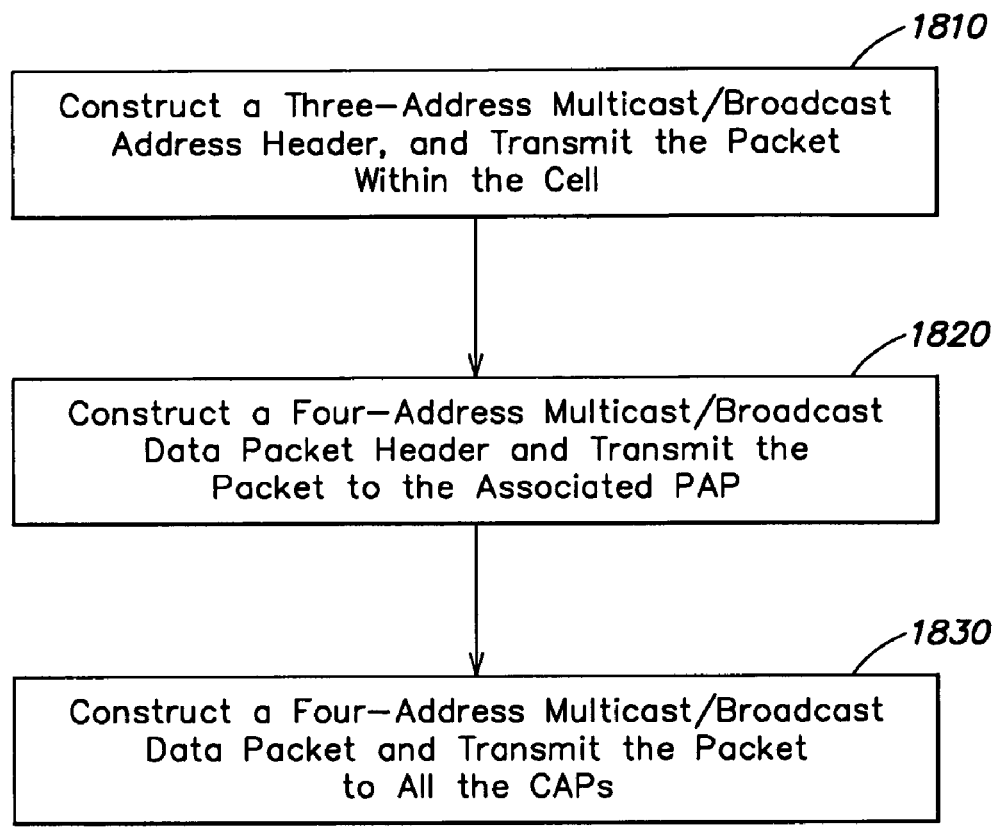
FIG. 18 is a flow diagram illustrating a method for a repeater access point to transmit an IEEE 802.11 multicast/broadcast packet according to an embodiment of the present invention.

Referring now to FIG. 18, a flow diagram illustrates a method for transmitting an IEEE 802.11 multicast/broadcast data packet. More particularly, block 1810 provides for constructing a three-address multicast/broadcast address header, and transmitting the packet within the cell. Block 1820 provides for constructing a four-address multicast/broadcast data packet header and transmitting the packet to the associated PAP. Block 1830 provides for constructing a four-address multicast/broadcast data packet and transmitting the packet to all the CAPs.

Packet Receiving and Transmitting in a Conventional AP

For a conventional AP to receive packets, two sources are possible, either normal stations in the cell and from CAPs that associate with the conventional AP. The types of packets possible include a plurality of types of packets, including management or control packets, IEEE 802.1x data packets, and unicast data packets and broadcast/multicast data packets.

Upon receiving a packet, a repeater AP will take specific operations based on the packet type and packet address type.

Figure 19:
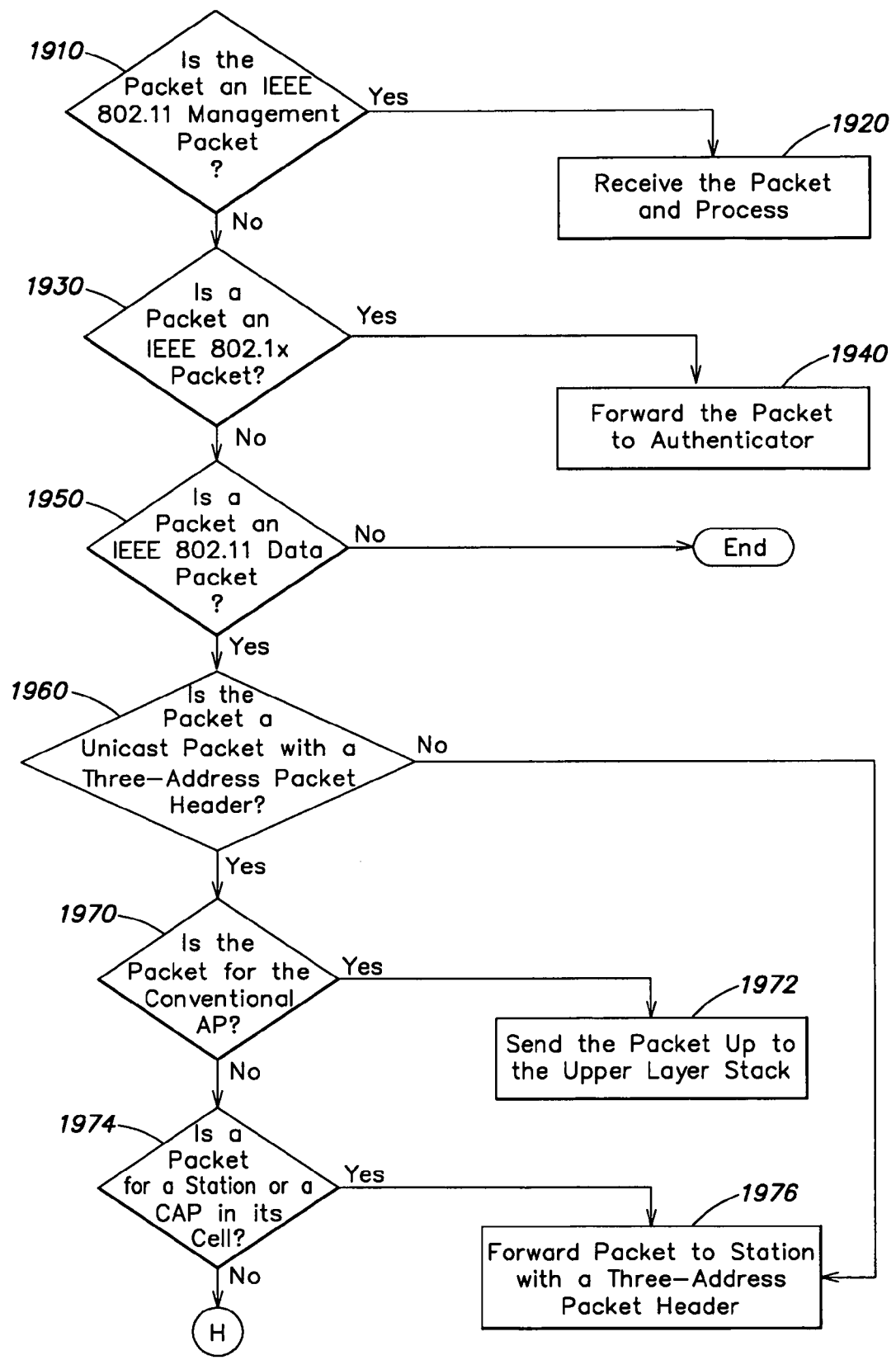
FIG. 19 is a flow diagram illustrating a method for a conventional access point to receive data packets according to an embodiment of the present invention.
Figure 19B:
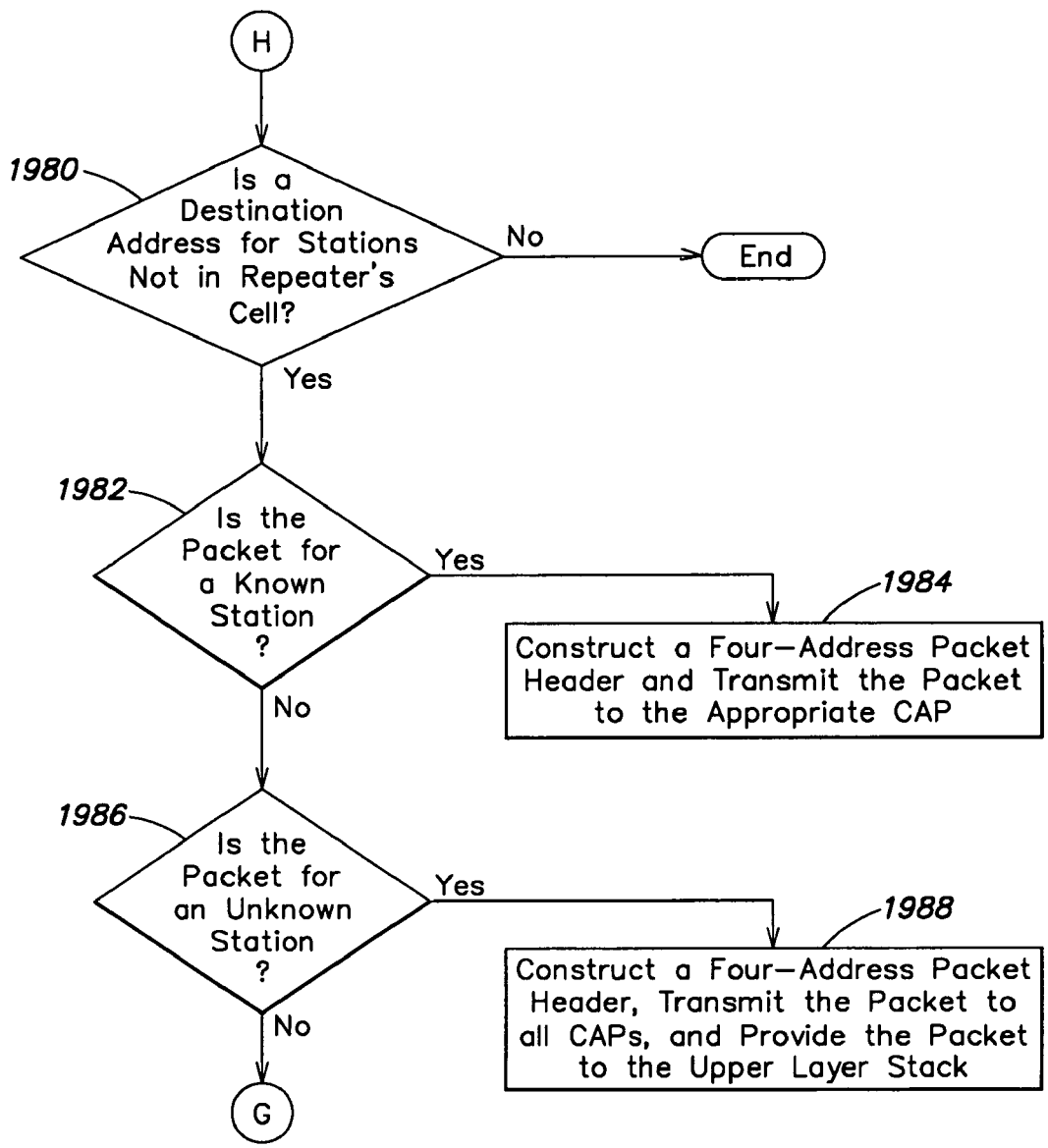
Figure 19C:
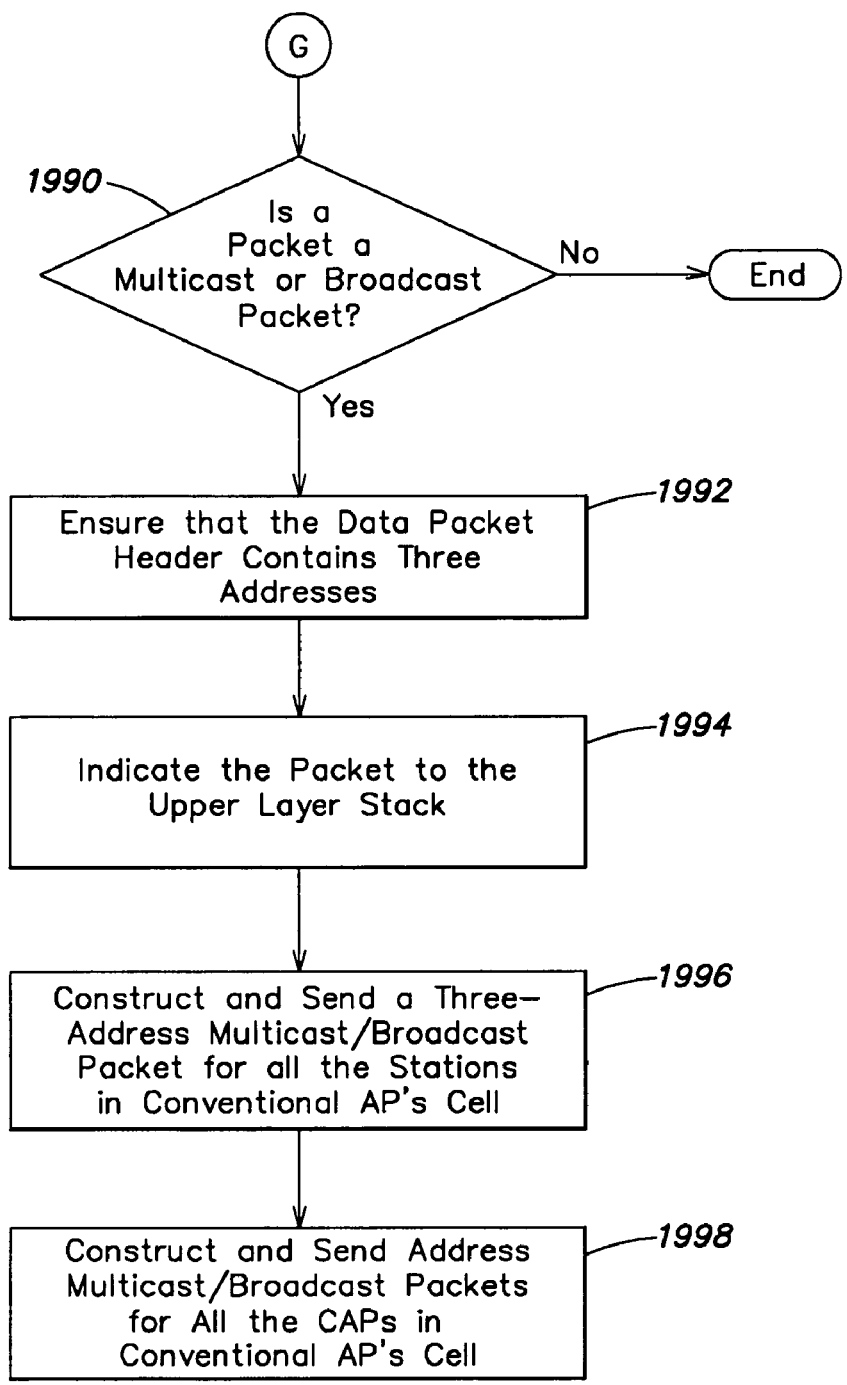

Referring now to FIG. 19, a flow diagram illustrates a method for receiving packets from a station in the convention AP's cell area. Block 1910 provides for determining if the packet is an IEEE 802.11 management packet. If so, block 1920 provides for receiving the packet and processing the packet by the conventional AP's station association manager (SAM). Block 1930 provides for determining if a packet is an IEEE 802.1x packet. If so, the packet must have been sent from a station's IEEE 802.1x supplicant. Block 1940 provides for receiving the packet and forwarding the packet to the conventional AP's IEEE 802.1x authenticator.

Block 1950 provides for determining whether a packet is an IEEE 802.11 data packet. If so, block 1960 provides for determining whether the packet is a unicast packet with a three-address packet header. If so, block 1970 provides for determining if the packet is for the conventional AP. If so, block 1972 provides for sending the packet up to the upper layer stack. Block 1974 provides for determining if a packet is for a station or a CAP in its cell. If so, block 1976 provides for forwarding the packet to the station with a three-address packet header.

Block 1980 provides for determining whether a destination address is for stations not in repeater's cell. If so, block 1982 provides for determining if the packet is for a known station. If so, block 1984 provides for constructing a four-address packet header and transmitting the packet to the appropriate CAP.

Block 1986 provides for determining if the packet is for an unknown station. If so, block 1988 provides for constructing a four-address packet header, transmitting the packet to all CAPs, and providing the packet to the upper layer stack.

Block 1990 provides for determining if a packet is a multicast or broadcast packet. If so, block 1992 provides for ensuring that the data packet header contains three addresses. Next, block 1994 provides for indicating the packet to the upper layer stack. Block 1996 provides for constructing and sending a three-address multicast/broadcast packet for all the stations in conventional AP's cell. Block 1998 provides for constructing and sending address multicast/broadcast packets for all the CAPs in conventional AP's cell respectively.

Figure 20:
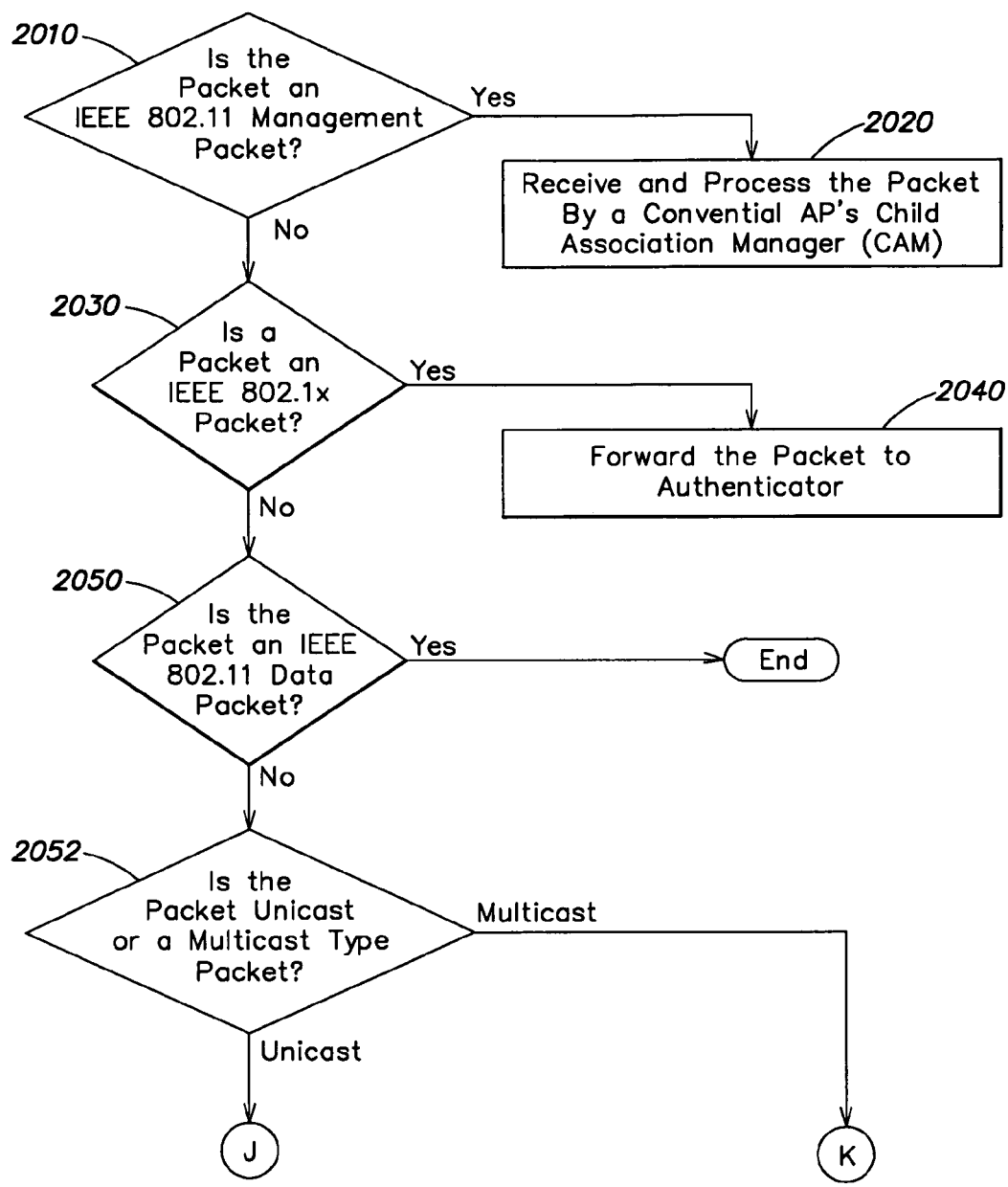
FIG. 20 is a flow diagram illustrating a method for a conventional access point to receive data packets from a child access point according to an embodiment of the present invention.
Figure 20B:
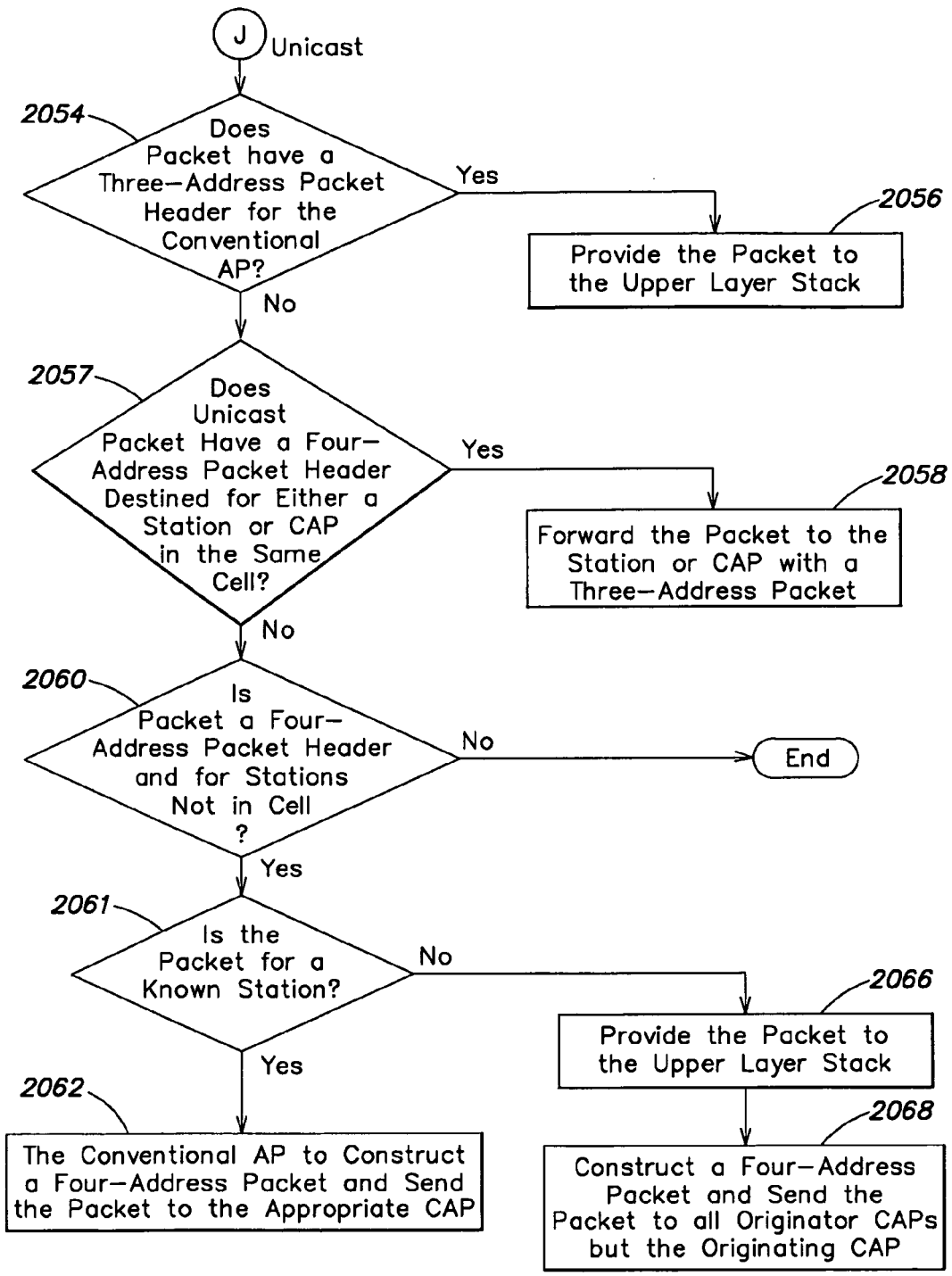
Figure 20C:
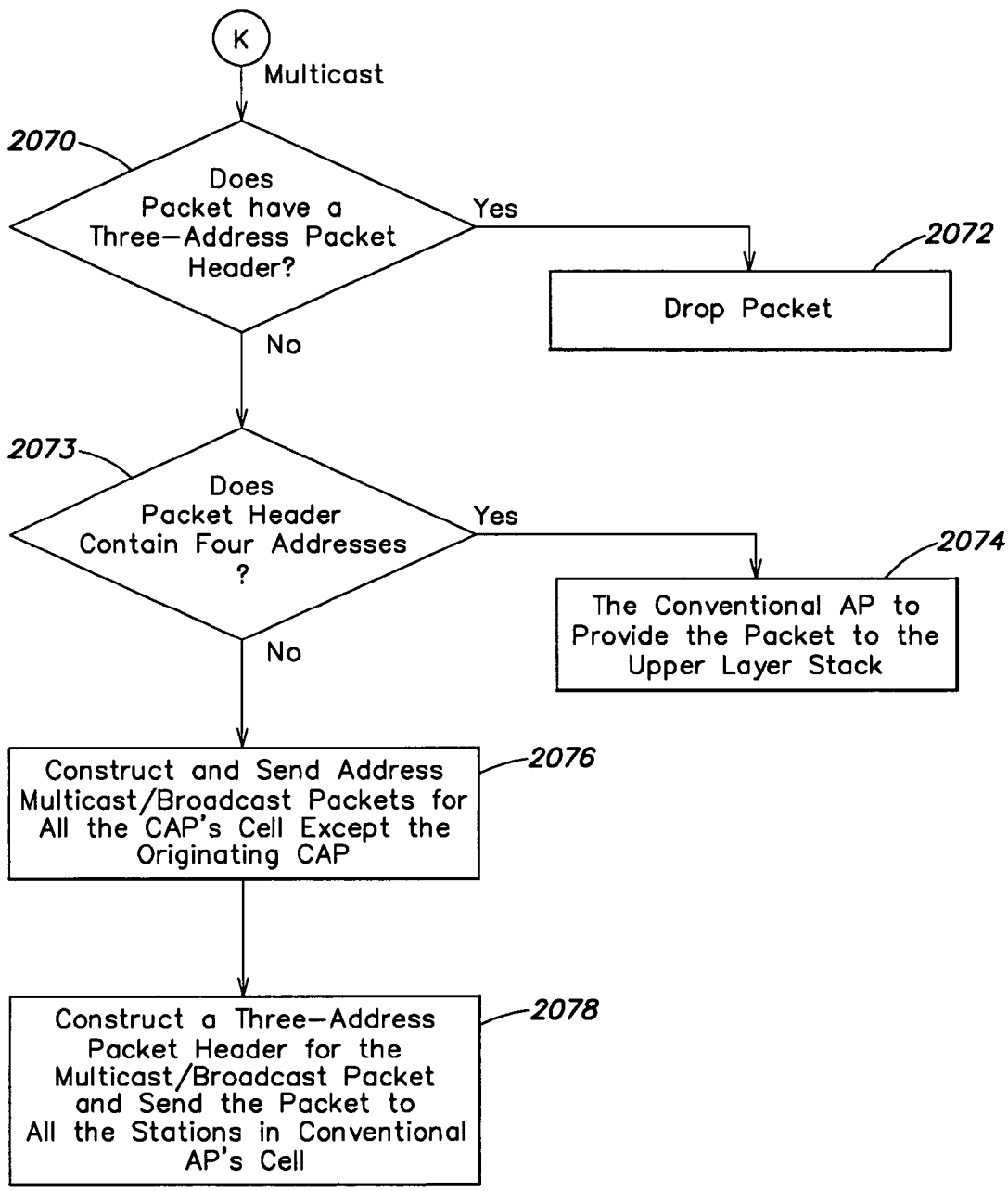

Referring now to FIG. 20, a flow diagram illustrates a method for a conventional AP to receive packets from a CAP. Block 2010 provides for determining whether the packet is an IEEE 802.11 management packet. If so, block 2020 provides for receiving and processing the packet by a conventional AP's child association manager (CAM).

Block 2030 provides for determining whether a packet is an IEEE 802.1x packet. If so, the packet must have been sent from a CAP's IEEE 802.1x supplicant. Therefore, block 2040 provides for receiving and forwarding the packet to conventional AP's IEEE 802.1x authenticator.

Block 2050 provides for determining whether the packet received from the CAP is an IEEE 802.11 data packet. If so, block 2052 provides for determining if the packet is unicast or a multicast type packet. If a unicast packet, block 2054 provides for determining if the packet has a three-address in packet header and is for the conventional AP. If so, block 2056 provides for providing the packet to the upper layer stack. Block 2057 provides for determining whether the unicast packet has a four-address packet header and is destined for either a station or CAP in the same cell. If so, block 2058 provides for the conventional AP to forward the packet to the station or CAP with a three-address packet. Block 2060 provides for determining whether the packet has a four-address packet header and is for stations not in conventional AP's cell. If so, block 2061 provides for determining if the packet is for a known or unknown station. If for a known station, block 2062 provides for the conventional AP to construct a four-address packet and send the packet to the appropriate CAP. If the packet is destined for an unknown station, block 2066 provides that the conventional AP provides the packet to the upper layer stack and then constructs a four-address packet and sends the packet to all CAPs but the originating CAP in block 2068.

If the conventional AP receives a multicast or broadcast packet, block 2070 provides for determining the number of addresses in the packet header. Block 2071 provides for determining if the data packet has a three-address packet header. If so, block 2072 provides for the conventional AP to drop the packet. Block 2073 provides for determining if the data packet header contains four addresses. If so, block 2074 provides for the conventional AP to provide the packet to the upper layer stack. Next, block 2076 provides for the conventional AP to construct and send address multicast/broadcast packets for all the CAPs in conventional AP's cell, except the originating CAP. Next, block 2078 provides for the conventional AP to construct a three-address packet header for the multicast/broadcast packet and send the packet to all the stations in conventional AP's cell.

Figure 21:
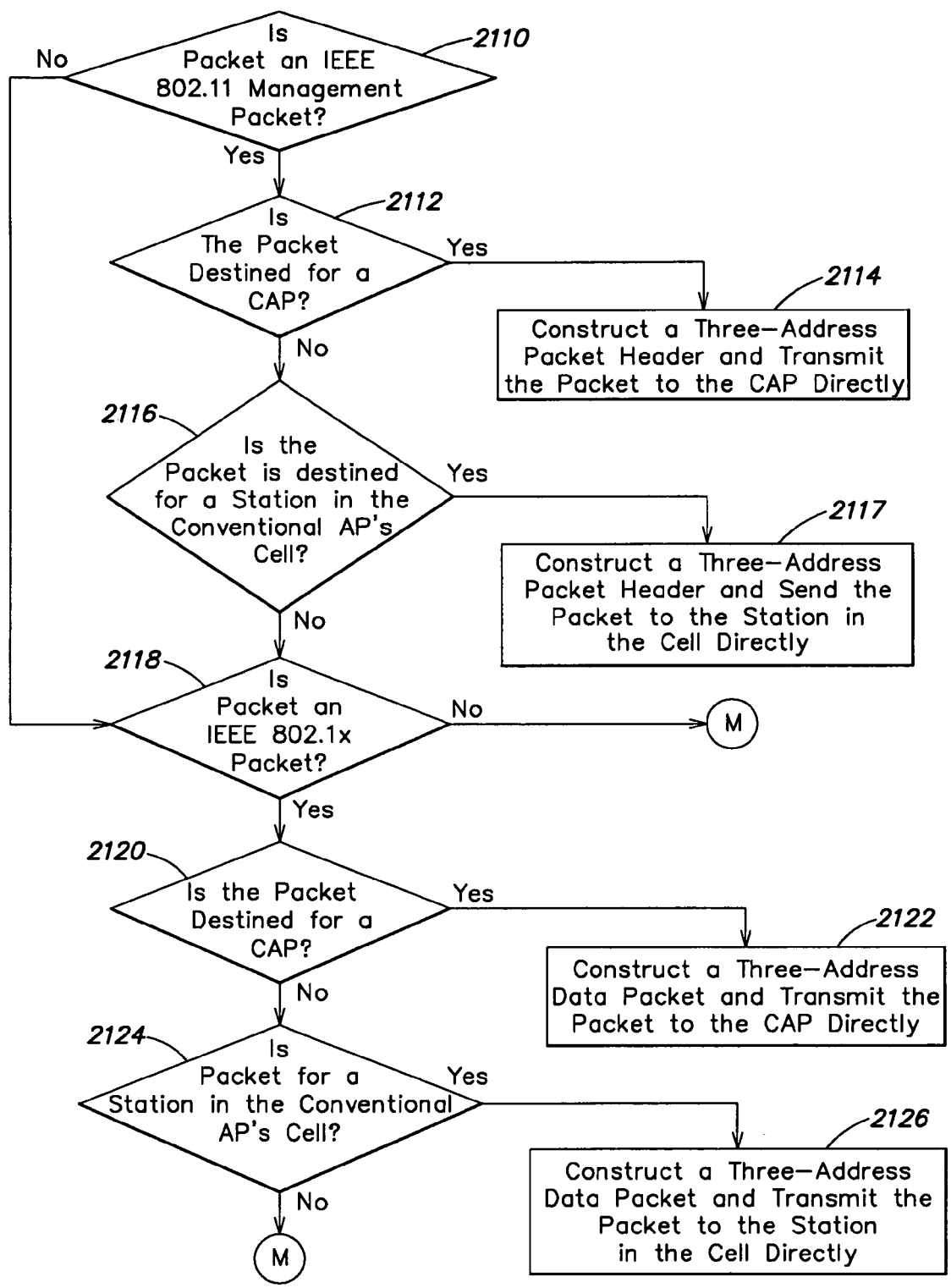
FIG. 21 is a flow diagram illustrating a method for a conventional access point to transmit packets according to an embodiment of the present invention.
Figure 21B:
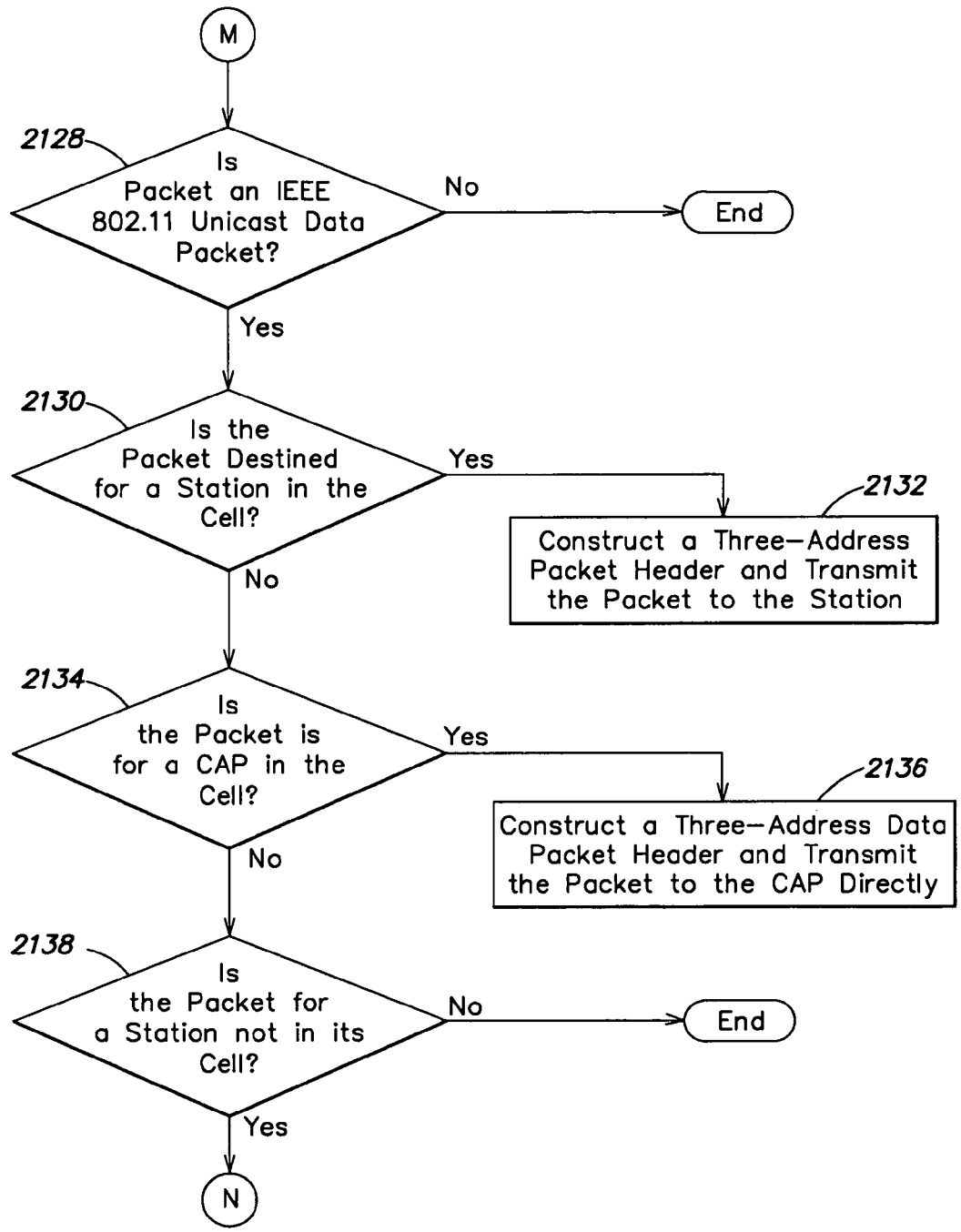
Figure 21C:
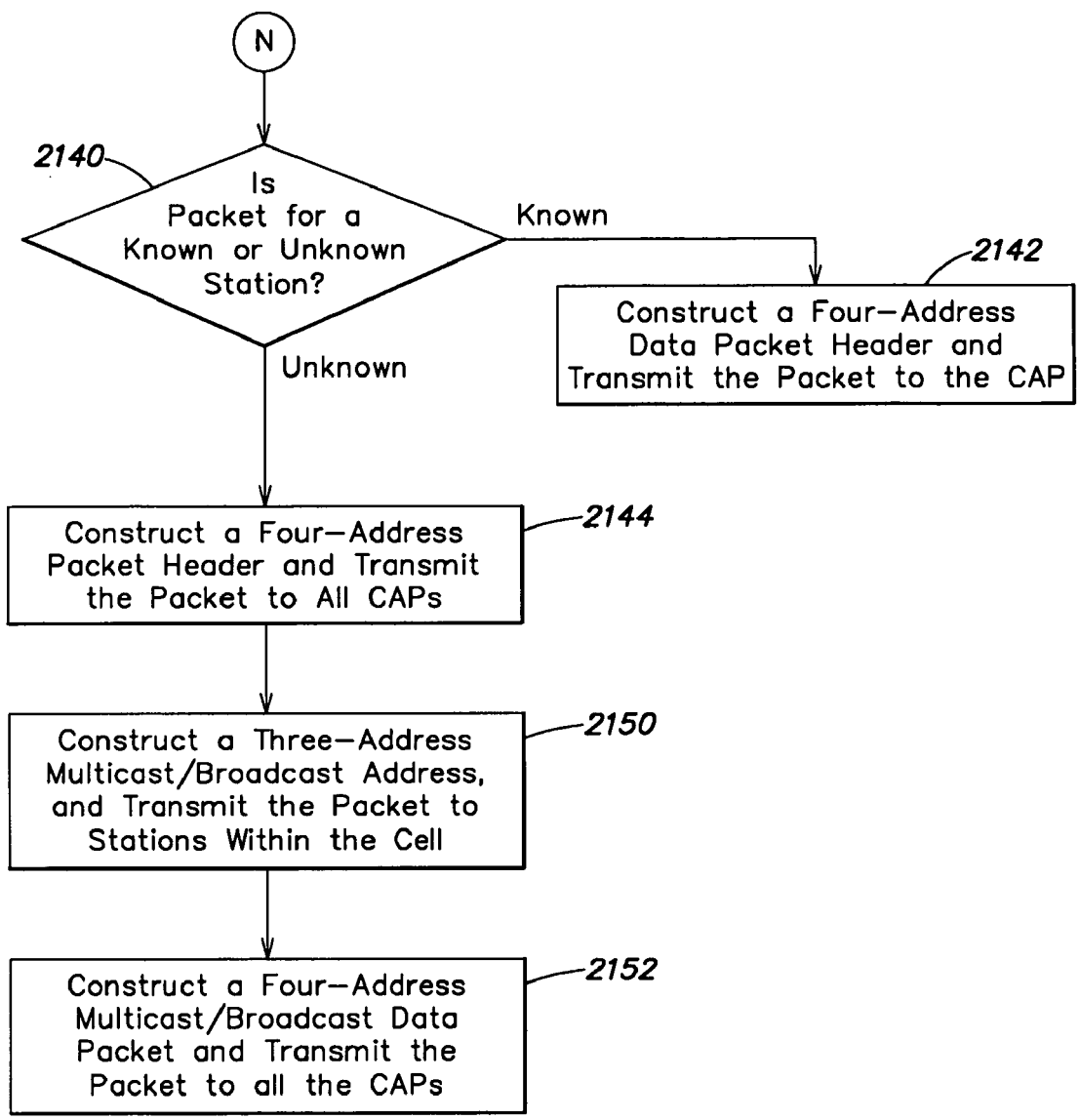

Referring now to FIG. 21, a flow diagram illustrates a method for a conventional AP to transmit packets according to an embodiment. A conventional AP could generate packets locally and transmit to different destinations. The type of packets includes IEEE 802.11 management packets, data packets, and IEEE 802.1x packets from either a local supplicant or local authenticator. The packet can have a destination address, different address types (unicast or multicast/broadcast), and a different number of addresses in the packet header. A conventional AP can also transmit packets for forwarding.

Block 2110 provides for determining if the packet to be transmitted is an 802.11 management packet, an IEEE 802.1x packet, an IEEE 802.11 unicast packet or an IEEE 802.11 multicast packet.

If the packet is an IEEE 802.11 management packet, block 2112 provides for determining whether the packet is destined for a CAP. If so, block 2114 provides for constructing a three-address packet header and transmitting the packet to the CAP directly. Block 2116 provides for determining whether the packet is destined for a station in the conventional AP's cell. If so, block 2117 provides for constructing a three-address packet header and sending the packet to the cell directly.

Block 2118 provides for determining if the packet is an IEEE 802.1x packet. If so, block 2120 provides for determining whether the packet is destined for a CAP. If so, block 2122 provides for constructing a three-address data packet and transmitting the packet to the CAP directly. If the packet is an IEEE 802.1x packet for a station in the conventional AP's cell, block 2124 block 2126 provides for constructing a three-address data packet header and transmitting the packet to the station in the cell directly.

If the packet to be transmitted by the conventional AP is an IEEE 802.11 unicast data packet 2128, block 2130 provides for determining whether the packet is destined for a station in the cell. If so, block 2132 provides for constructing a three-address data packet header and transmitting the packet to the station directly. Block 2134 provides for determining if the packet is for a CAP in the cell. If so, block 2136 provides for constructing a three-address data packet header and transmitting the packet to the CAP directly.

Block 2138 provides for determining if the packet is for a station not in its cell. If so, block 2140 provides for determining of the packet is for a known or unknown station. If a known station, block 2142 provides for the conventional AP to construct a four-address data packet header and transmitting the packet to the CAP.

If it is for an unknown station, block 2144 provides for the conventional AP to construct a four-address packet header and transmit the packet to all CAPs.

If the packet is an IEEE 802.11 multicast/broadcast data packet, block 2150 provides for constructing a three-address multicast/broadcast address, and transmitting the packet to stations within the cell. Next, block 2152 provides for the conventional AP to construct a four-address multicast/broadcast data packet and transmit the packet to all the CAPs.

In view of the many possible embodiments to which the principles of this invention can be applied, it will be recognized that the embodiment described herein with respect to the drawing figures is meant to be illustrative only and are not be taken as limiting the scope of invention. For example, those of skill in the art will recognize that the elements of the illustrated embodiment shown in software can be implemented in hardware and vice versa or that the illustrated embodiment can be modified in arrangement and detail without departing from the spirit of the invention. Therefore, the invention as described herein contemplates all such embodiments as can come within the scope of the following claims and equivalents thereof.

We claim:

1. A method for an access point in a wireless local area network (WLAN), the method comprising:
    receiving one or more data packets;
    if the data packet is destined for one of a station in a local cell and a child access point (CAP) associated with the wired access point, forwarding the data packet;
    if the data packet is destined for a CAP or a station outside the local cell:
        determining the hierarchical location of the CAP or station within the LAN, the WLAN including a hierarchical access point structure; and
        altering the data packet according the location of the CAP or station in the hierarchical access point structure.

2. The method of claim 1 further comprising determining a type of the one or more data packets, the type including one of a unicast data packet, a multicast data packet, a management-type packet, and an authenticated packet.

3. The method of claim 1 wherein the altering the data packet includes constructing one of a three or four address packet header to identify two or more access points required to route the data packet.

4. The method of claim 1 wherein the access point in the WLAN is a wireless access point.

5. The method of claim 1 wherein if the data packet is destined for a CAP, the data packet is further destined for a station within the local cell.

6. A computer-readable medium having computer-executable instructions stored thereon, that, when executed by a computer, cause the computer to perform a method comprising:

receiving one or more data packets;

if the data packet is destined for one of a station in a local cell and a child access point (CAP) associated with the wired access point, forwarding the data packet;

if the data packet is destined for a CAP or a station outside the local cell:

determining the hierarchical location of the CAP or station within the LAN, the WLAN including a hierarchical access point structure; and altering the data packet according the location of the CAP or station in the hierarchical access point structure.

* * * * *